United States Patent

Vanderpool et al.

[11] 4,019,174
[45] Apr. 19, 1977

[54] DATA COLLECTING AND TRANSMITTING SYSTEM

[75] Inventors: James L. Vanderpool, Centerville; Dennis J. Hoertt, Dayton, both of Ohio

[73] Assignee: Monarch Marking Systems, Inc., Dayton, Ohio

[22] Filed: Sept. 17, 1973

[21] Appl. No.: 397,945

Related U.S. Application Data

[63] Continuation of Ser. No. 205,810, Dec. 8, 1971.

[52] U.S. Cl. ............................................ 340/172.5
[51] Int. Cl.$^2$ ............................................ G06F 3/14
[58] Field of Search ............... 340/172.5, 173 RC; 360/39; 445/1; 235/92 SL; 179/155 F

[56] References Cited

UNITED STATES PATENTS

| | | | |
|---|---|---|---|
| 2,961,535 | 11/1960 | Lanning | 340/173 RC |
| 3,328,772 | 6/1967 | Oeters | 340/172.5 |
| 3,351,917 | 11/1967 | Shimibukuro | 340/172.5 |
| 3,400,384 | 9/1968 | Hildebrandt | 340/172.5 |
| 3,480,931 | 11/1969 | Geissler et al. | 360/39 |
| 3,581,290 | 5/1971 | Sugarman | 340/172.5 |
| 3,634,832 | 1/1972 | Taddei | 340/172.5 |
| 3,823,388 | 7/1974 | Chadima, Jr. et al. | 340/172.5 |
| 3,859,640 | 1/1975 | Eberlein et al. | 340/173 RC |

OTHER PUBLICATIONS

"System 900 for Computerized Order Entry", Brochure from Electronics Inc., pp. 1–4, dated Oct. 1971.

*Primary Examiner*—Harvey E. Springborn
*Attorney, Agent, or Firm*—Mason, Kolehmainen, Rathburn & Wyss

[57] ABSTRACT

A data collecting and transmitting system includes a dynamic MOS circulating memory in a portable handheld unit. The memory is divided into N discrete time slots in a repetitive time frame for storing N data entries supplied by a keyboard input or a peripheral input unit. A load point counter operating in the same time frame is slipped a time slot on each entry to provide a variable marker representing the next empty time slot for receiving an entry. The memory contents can be supplied to a visual display in the hand unit or to an external transmitter into which the hand unit can be plugged. An output point counter operating in the same time frame is slipped a time slot as each stored data entry is read out to provide a variable marker representing the next data entry to be withdrawn from storage. The system also includes a message counter whose contents are transferrable to the visual display to indicate the number of entries, and this system also includes a clock rate control for changing the time frame between a slow rate for circulation of data and a fast rate for input and output operations. The hand unit is normally powered by batteries but operates on a line power source when plugged into the transmitter to permit the hand unit batteries to be charged during the transmission period.

15 Claims, 12 Drawing Figures

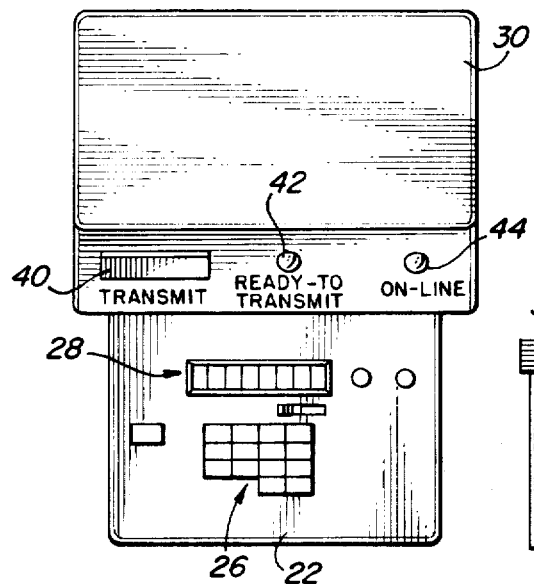
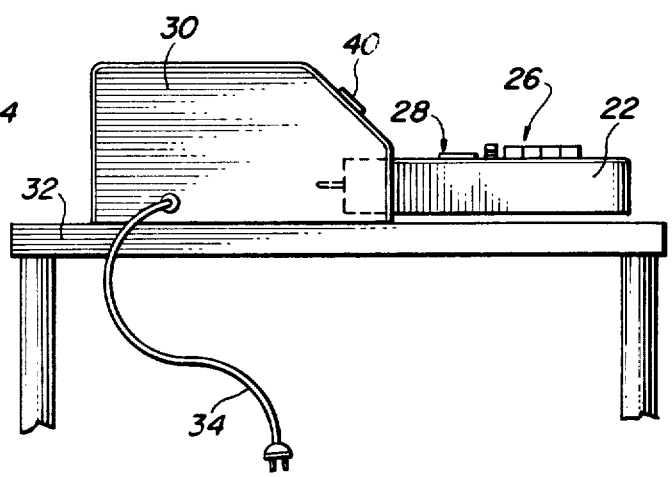
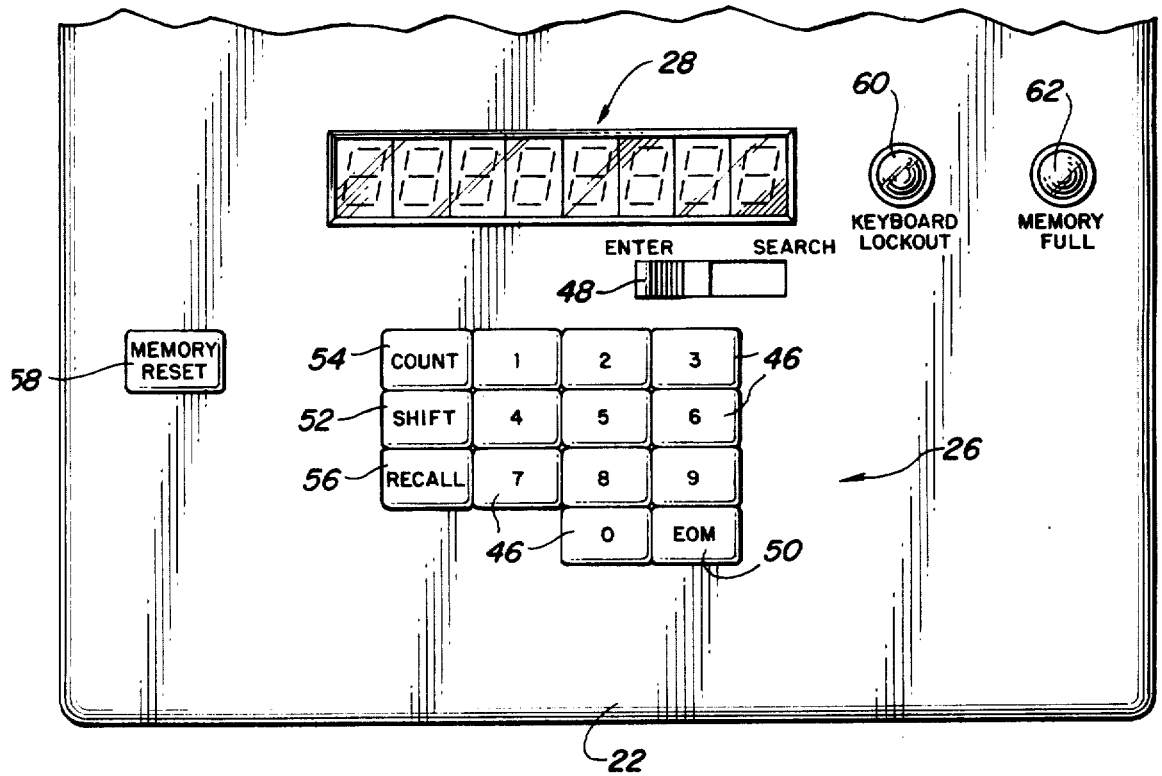

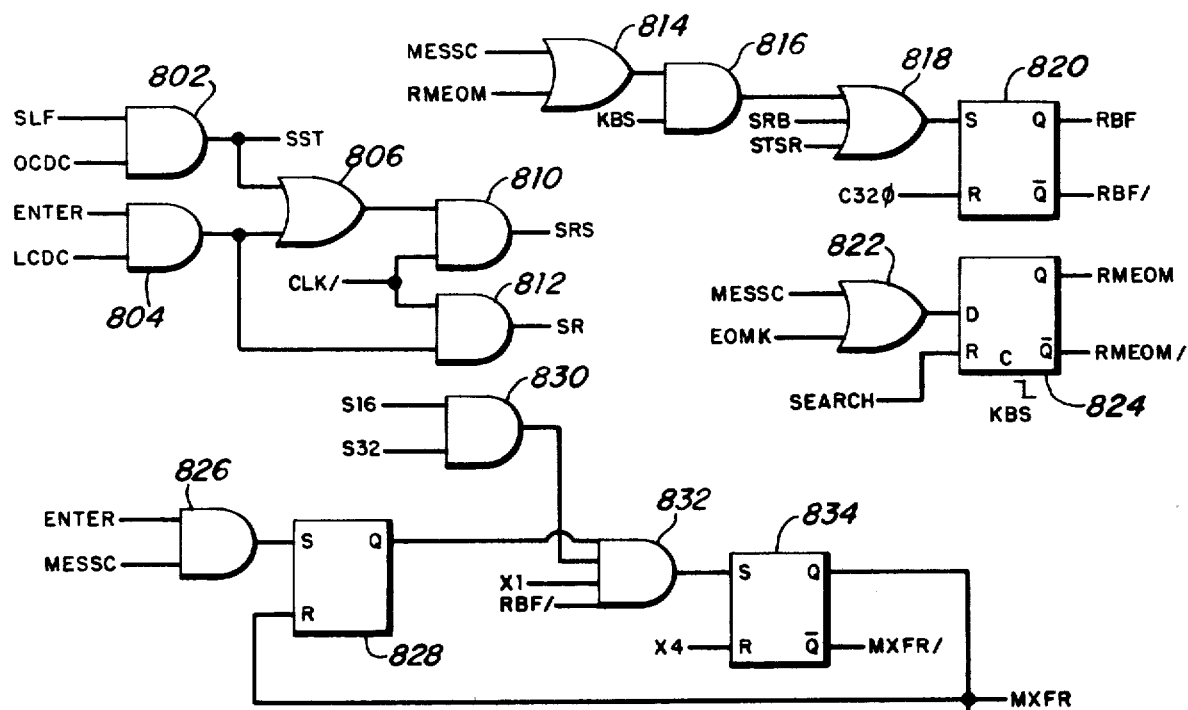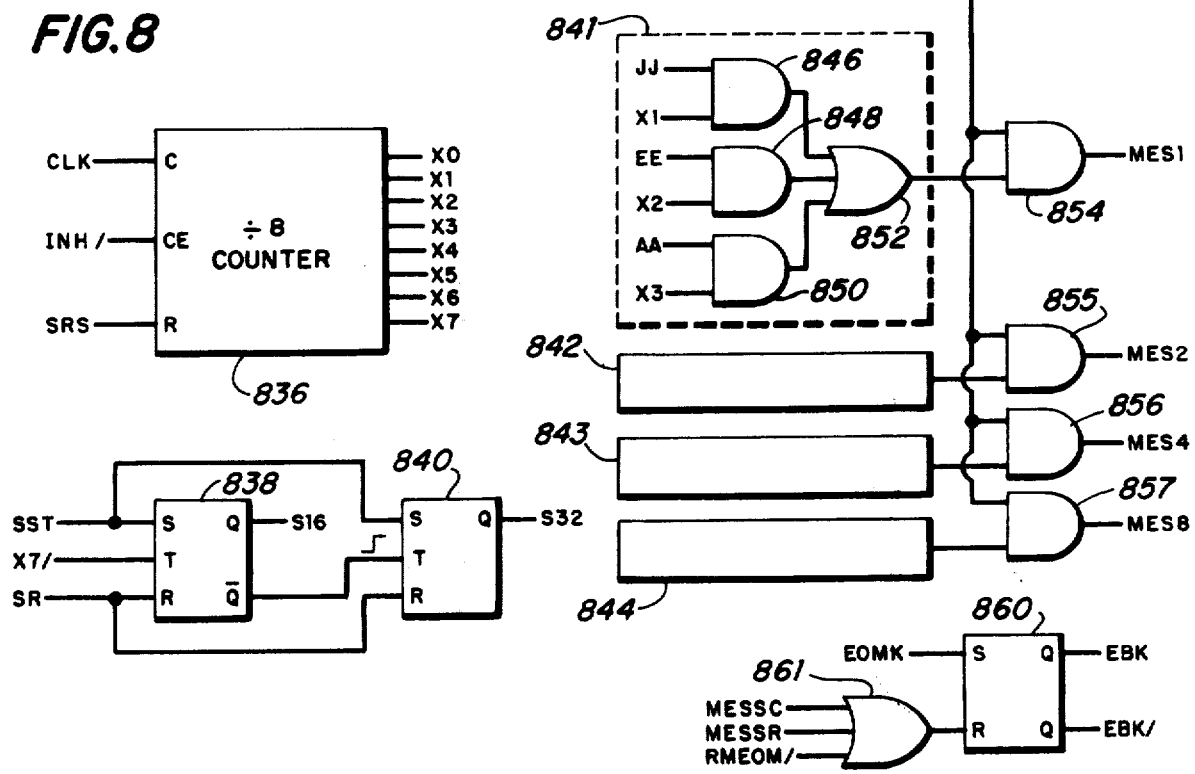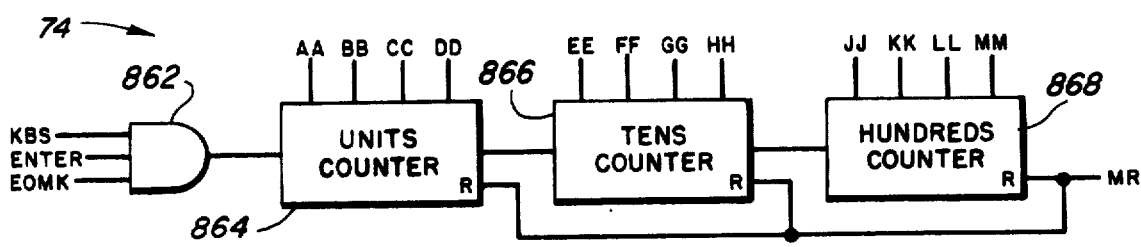
FIG.8

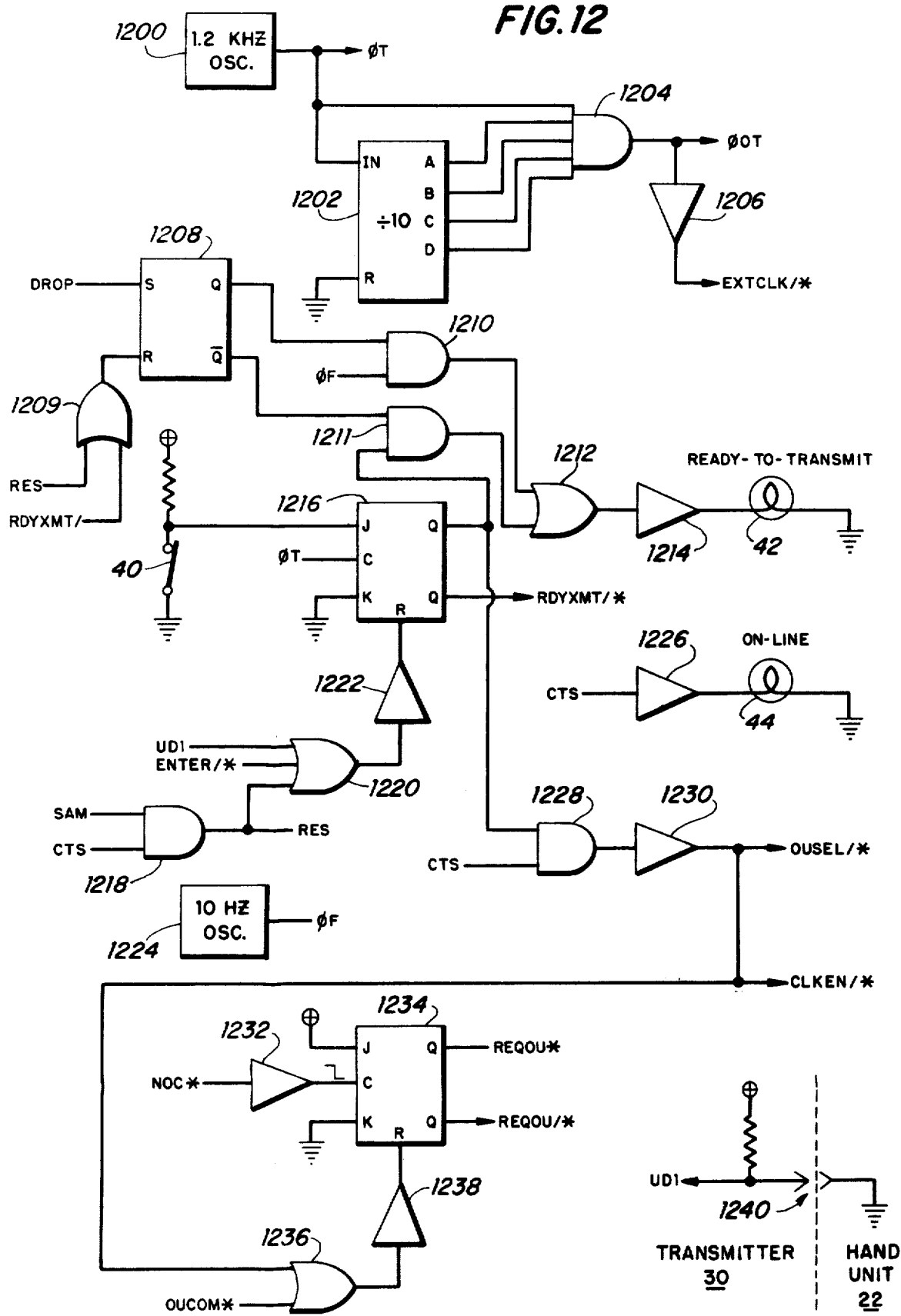

DATA COLLECTING AND TRANSMITTING SYSTEM

This is a continuation of application Ser. No. 205,810, filed Dec. 8, 1971.

This invention relates to a data collecting and transmitting system and, more particularly, to such a system including a dynamic circulating memory that can be hand-held during input operation and is coupled to a stationary transmitter during output operation.

The increasing use of various types of information in business operations and particularly the utilization of this information in central data processors presents a problem of reliable field acquisition of this information in a form suitable for processor use. As an example, a retail marketing chain commonly supplies a number of satellite retail stores from a central warehouse or facility, and the retail outlets frequently must order a large number of different items from the central facility on a daily basis because of the absence of storage facilities at the retail outlets. These orders can be placed using oral communication or written orders, but the accuracy of ordering and invoicing in this manner is frequently below a desired level.

Devices have, for example, been designed carried on wheeled vehicles by which a store operator can study stock on the floor and actuate a keyboard input to produce a punched or magnetic order record. This record can then be read and transmitted over a communication link to a central processor. This type of unit is, however, cumbersome, relatively high in cost, and does not easily permit an operator to recall or review order data previously ordered or to alter previously entered data.

Accordingly, one object of the present invention is to provide a new and improved data collecting and storing system.

A further object is to provide such a system including a portable hand-held unit for entering and storing data which can be plugged into a transmitter and read out over a communication link in machine language to a central processor.

A further object is to provide a dynamic circulating storage unit or memory in a portable unit powered by batteries and operable at different clock rates to conserve power.

A further object is to provide a portable data collecting unit having a circulating data memory, a keyboard memory input, a visual display, and controls for effecting the display of entries as made or of entries recalled from memory.

Another object is to provide a portable battery-powered data collecting and storing unit that can be detachably connected to a transmitter and in which the portable unit is powered from the transmitter during transmission operations to permit the batteries for the portable unit to be concurrently charged.

A further object is to provide a dynamic circulating memory affording distinct time slots in a repetitive time frame for data storage in which one counter tracks the next available empty slot for receiving an entry and another counter tracks the entry that is next to be supplied to an output.

A further object is to provide such a memory in which the counters have the same repetitive time frame as the memory and the empty slots and stored entries are tracked by periodically changing the time frame for the counters as entries are made or read out.

In accordance with these and many other objects, an embodiment of the invention comprises a data transmitting and collecting system including among its components a hand-held or portable storage unit with a dynamic circulating memory for storing data entries supplied by a keyboard, a peripheral input unit such as a reader for also supplying data to be stored in the circulating memory of the hand-held unit, and a transmitter to which the hand unit can be plugged or detachably connected to permit the contents of the circulating memory to be transferred to a remote location or central processor. The hand-held unit is battery-powered to permit an operator to move, for example, through the aisles of a retail store and by use of the keyboard supply article identifying designations and quantity information for storage in the circulating memory. The peripheral input unit can be used, for example, to supply article identifying information in response to scanning of a coded record, and quantity information can be added to memory through the use of the keyboard.

When all of the desired data has been entered into the memory of the hand-held unit, it can be plugged into a stationary transmitter powered by conventional sources, and the hand unit converted from an enter mode of operation to a search mode of operation. By actuation of the transmitter and following the establishment of a valid communication link to the ultimate data receiver, the contents of the circulating memory in the hand unit are transferred over the link to the remote location or central data processor. During these operations the hand unit is powered by energy derived from the transmitter, and concurrently therewith the batteries normally used to power the hand unit are recharged to permit future remote operation of the hand-held unit. The system permits the use of a number of individual hand-held units for the acquisition and storage of data which can then be transmitted to the central processor by connecting the hand-held units to the transmitter in sequence.

The hand unit includes a main storage means or memory provided by a dynamic circulating shift register operated by a clock pulse source to define a given number of discrete time slots in a repetitive time frame with the time slots providing separate storage areas for separate data items. A load point counter operating in the same time frame as the main memory provides a marker designating the next empty time slot for enabling the keyboard to supply the next data entry to this time slot. The repetitive time frame of the load point counter is slipped a single time slot incident to each entry into main memory so as to enable the keyboard to enter the successive entries in successive adjacent time slots. The load point counter is similarly controlled when operating in conjunction with the peripheral input unit to store successive entries from the peripheral input unit in successive empty time slots in the main memory.

The hand unit also includes a plural digit visual display with which is associated an individual circulating display memory. In the enter mode of the hand unit, the keyboard entries supplied to the main memory are supplied to the display memory so that each entered digit in a plural digit message is visually displayed on a display in a position of proper significance concurrent with entry into the main memory. This visual display is terminated by actuation of a function or end-of-message key in the keyboard assembly to clear the display for the next message. This end-of-message key also controls a message counter in the hand unit to maintain a cumulative total of the number of messages entered into the main memory. The contents of the message counter comprising the cumulative total of entered messages can be transferred to the display memory and displayed on the visual display unit by actuation of a count function key in the keyboard assembly.

The provision of the visual display actuated concurrently with the entry of data messages into the main memory permits the operator to easily correct any errors in the data entered. If the operator observes an incorrect digit in the display, a shift function key can be operated. The operation of this key effectively increments the repetitive time frame of the load point counter by a single time slot to access the time slot containing the incorrect digit after which a control circuit erases the entry from memory. Since the load point counter is now marking the time slot from which the digit has been erased, the keyboard input can be operated to supply the correct digit for storage in the memory.

The hand unit also includes means by which the operator can recall to the visual display message information stored in the main memory. This is accomplished by actuating a function control on the hand unit to convert this unit from its enter mode to a search mode. When the hand unit is in the search mode, each actuation of the end-of-message function key transfers a message from main memory to display memory for display in the hand unit. To control this transfer, the hand unit includes an output point counter operating in the same repetitive time frame as the main memory. This counter provides a marker designating the most significant digit in the main memory that is to be withdrawn therefrom. As each digit is withdrawn from main memory, the time frame of the output point counter is slipped a single time slot so that the next most significant digit can be selected for transfer. The shift function key is effective in the search mode to shift the visual display a single position so as to permit display of all of the digits of a message whose total character count exceeds the display capacity.

The hand unit also includes a control circuit for reducing to the greatest extent possible the power consumed by its components inasmuch as the unit is powered by conventional batteries. This conservation is accomplished by changing the clock rate of the main memory between a high rate during input and output operations and a low rate during intervals in which entered data is circulating in the main memory. The power consumed by the unit increases appreciably with an increase in clock rate so that power requirements are reduced by normally circulating data through the main memory at a relatively low clock rate. However, whenever data is inputted into the hand unit or data is transferred out of memory to either the transmitter or to the display memory, it is necessary to increase the clock rate to permit the required functions to be carried on in a minimum amount of time. Accordingly, circuits are provided in the hand unit for sensing a demand for an input or output operation and for automatically shifting the clock rate from the normal low level to a high level whenever one of these operations is required.

When the contents of the main memory are to be transferred through the transmitter to a central processor, the hand unit is plugged into the transmitter. When this occurs, circuits in the transmitter provide the necessary operating potential for the hand unit and also concurrently isolate the batteries therein from the logic components of the hand unit and establish charging circuits for the batteries. The hand unit is placed in its search mode, and the output point counter controls the transfer of successive data entries from the main memory to the transmitter from which its information is communicated over a suitable link to the ultimate data utilizing device. This transfer of data out of the main memory is not destructive, and the contents of the memory are preserved for subsequent retransmission if desirable. The main memory is cleared, and the load and display point counters are reset to normal states by operating a main reset function switch on the hand unit.

Many other objects and advantages of the present invention will become apparent from considering the following detailed description in conjunction with the drawings in which:

FIG. 1 is a top elevational view of a coupled hand unit and transmitter embodying the present invention;

FIG. 2 is a side elevational view of a coupled hand unit and transmitter;

FIG. 3 is a fragmentary and enlarged top plan view of a portion of the hand unit illustrating visual display means and a keyboard with data entry and control keys;

Figure 9:
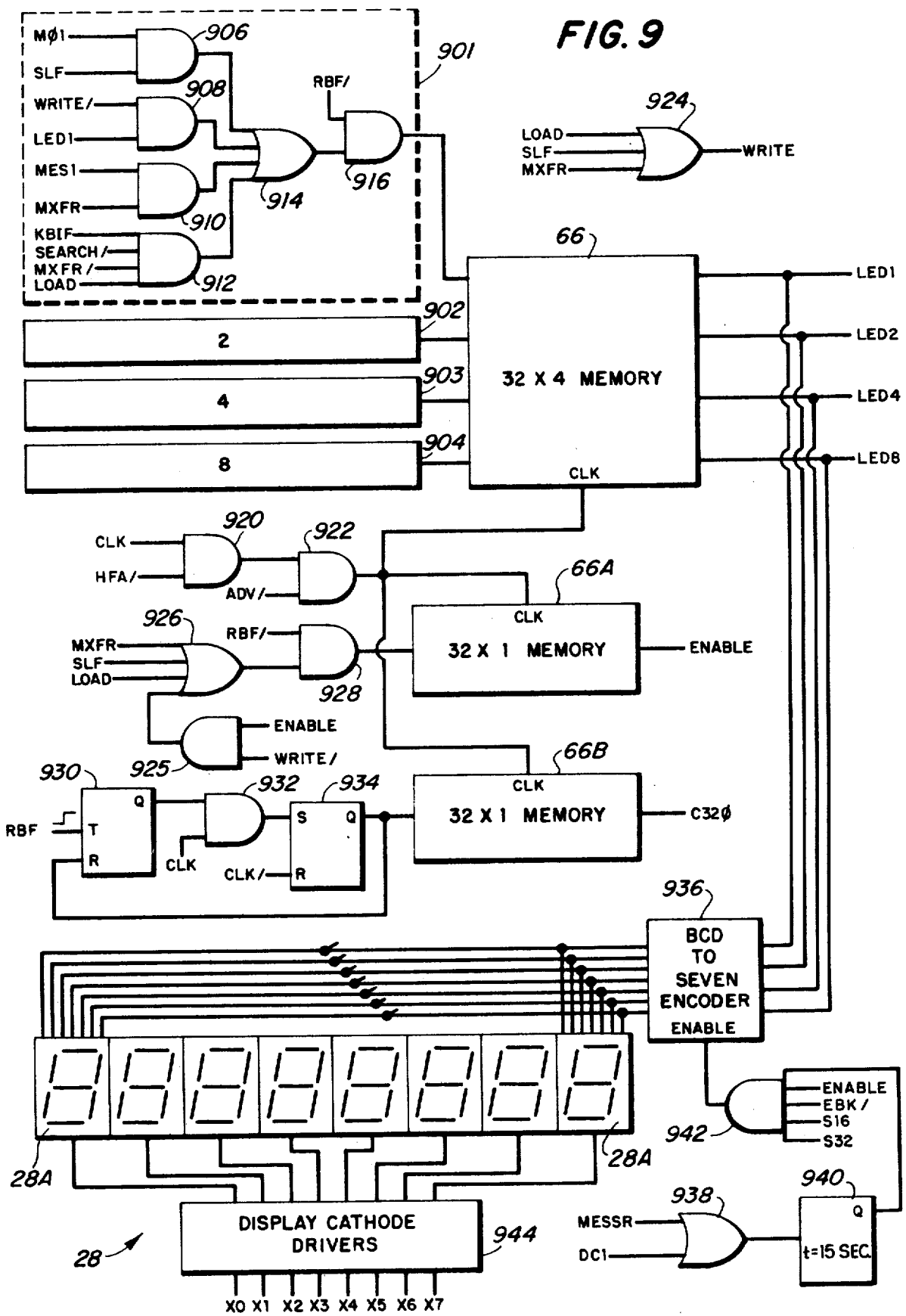
Figure 10:
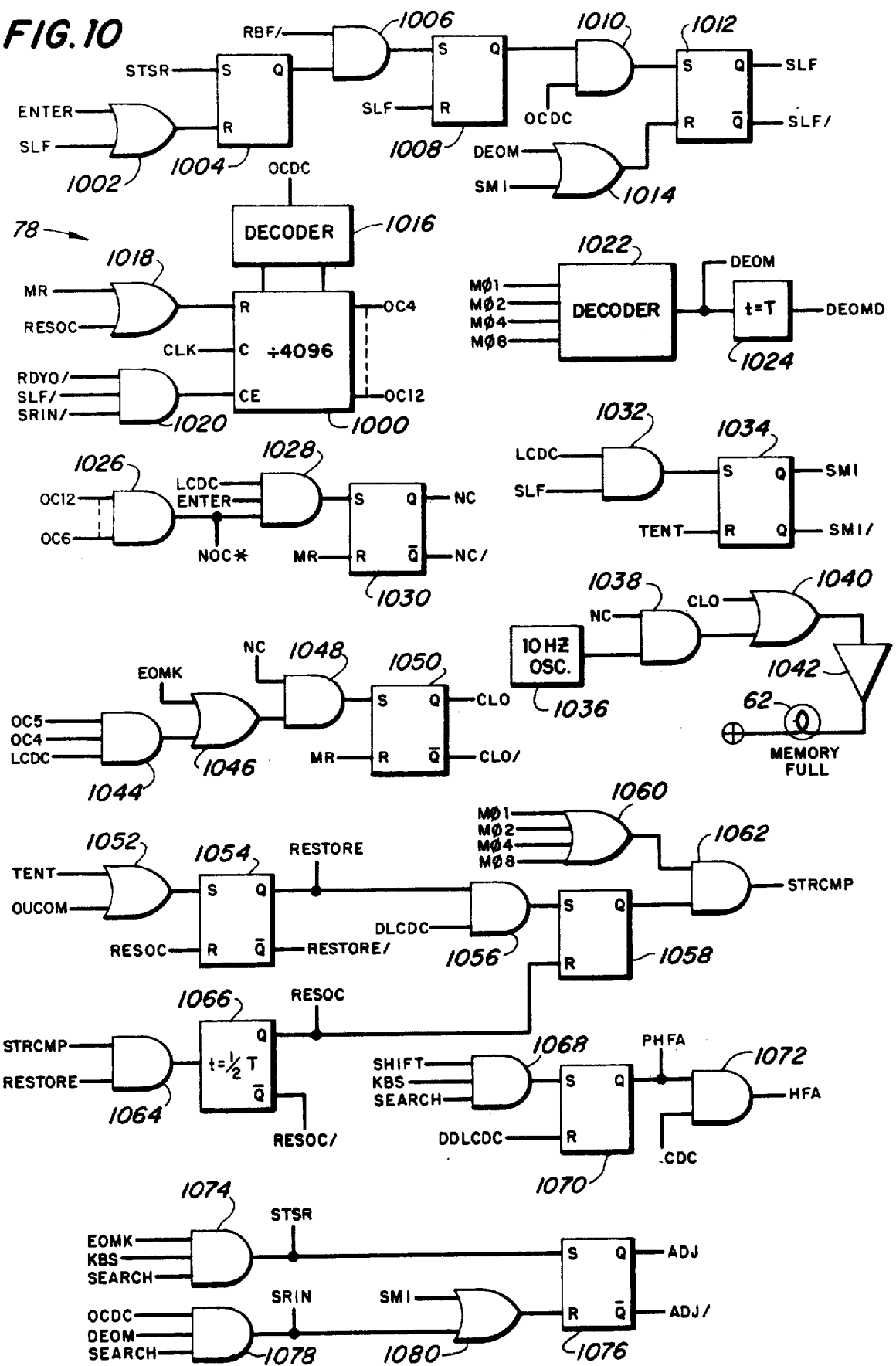
Figure 11:
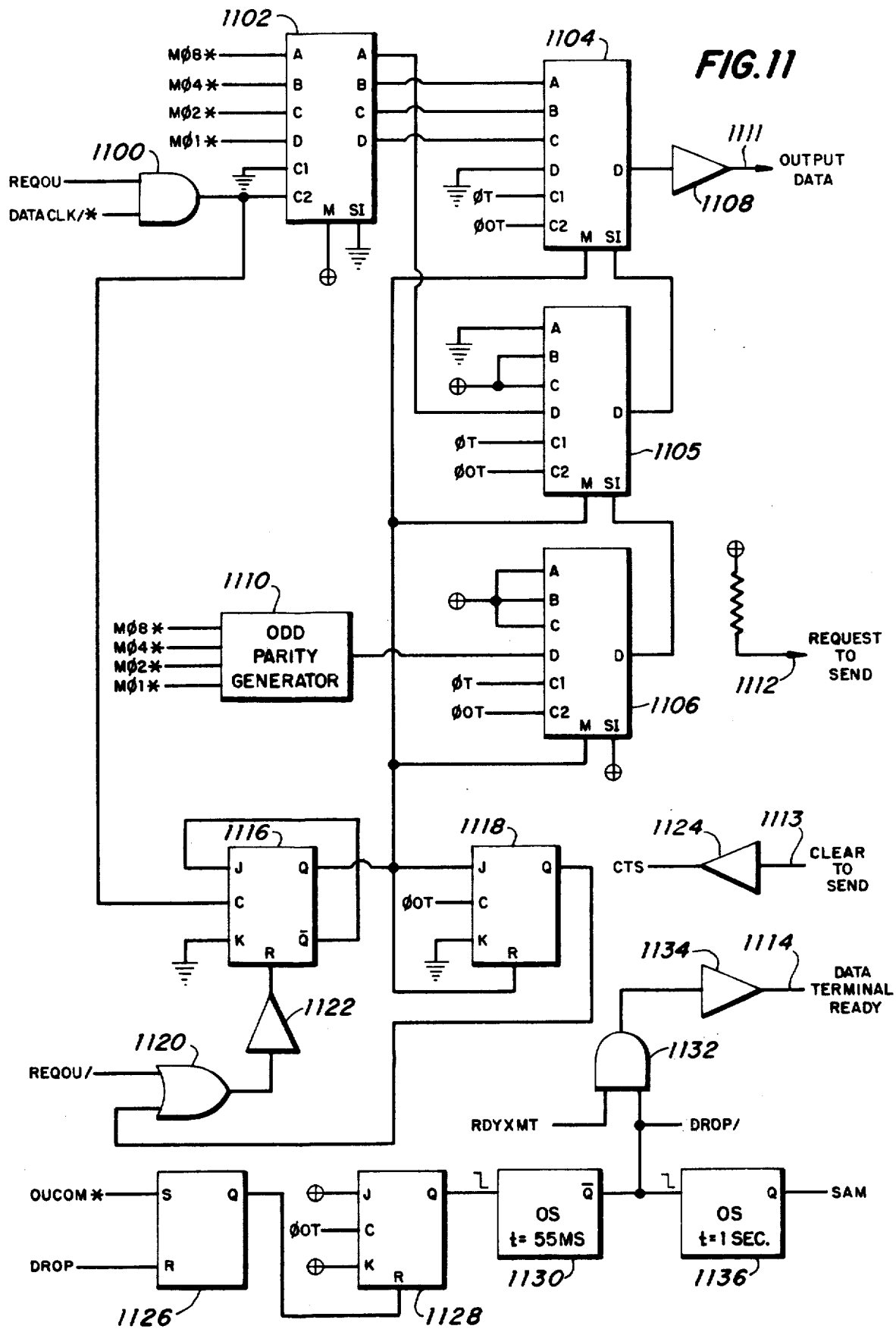

FIGS. 6–10 form a complete circuit diagram in logic form of the components of a hand unit embodying the present invention; and FIGS. 11 and 12 are schematic circuit diagrams in logic form illustrating a transmitter constructed in accordance with the present invention.

Figure 4:
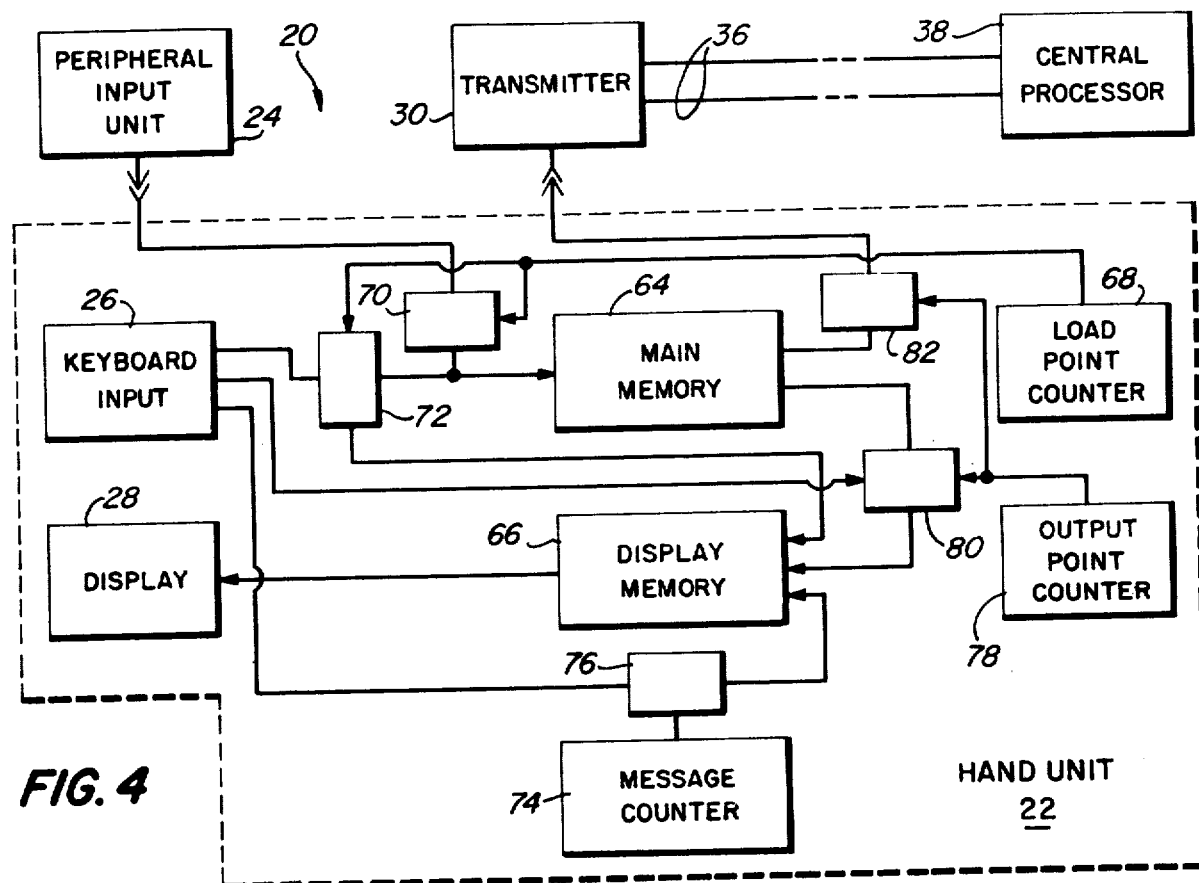
FIG. 4 is schematic circuit diagram in block form illustrating the components of a system embodying the present invention.

Referring now more specifically to FIG. 4 of the drawings, therein is illustrated a system indicated generally as 20 which embodies the present invention and which includes a hand unit 22 for storing data entries or plural digit messages in accordance with data supplied either from a peripheral input unit 24 or a keyboard input 26 forming a part of the hand unit 22. The hand unit 22 is a complete self-contained unit having its own housing and powered by batteries. This permits the unit 22 to be carried by an operator through, for instance, the aisles of a retail store and permits the operator to enter article identifying and quantity information into the memory of the unit 22 by manual actuation of the keyboard input 26. A visual display 28 forming a part of the hand unit 22 (FIGS. 1, 2, and 4) permits the operator to determine the accuracy of the entered data and to correct incorrect data by the use of function keys included in the keyboard input 26.

When all of the relevant data relating to, for example, a single order has been stored in memory in the hand unit 22, this unit is detachably secured to or plugged into a transmitter unit 30 forming a portion of the system 20. The transmitter unit 30 can, for example, be mounted on a suitable supporting structure or table 32 (FIG. 2) and is powered by a conventional alternating current source to which the transmitter 30 can be connected by a conventional line cord 34. The transmitter unit 30 includes a recess into which one end of the hand unit 22 can be inserted, and the units 22 and 30 are provided with cooperating male and female connectors for electrically interconnecting these two units. When the units 22 and 30 are thus coupled, the logic components of the unit 22 are powered from the line cord 34, and the batteries normally used to power the unit 22 are recharged.

The transmitter unit 30 is designed for use with or includes a conventional modem by which the transmitter is coupled over a communication link or telephone line 36 (FIG. 4) to a central data processor 38 located, for example, in a remote area. When data transmission is to be initiated, the hand unit 22 is converted from its normal entry mode into a search mode by the actuation of function keys in the keyboard input 26, and a transmit switch 40 (FIG. 1) on the transmitter 30 is momentarily actuated. This conditions the transmitter 30 for operation and illuminates a visible indicator or lamp 42 representing this fact. When the data link 36 and the central processor 38 (FIG. 4) are in condition for transmission, a further visible indicator or lamp 44 (FIG. 1) is illuminated to advise the operator that transmission will be initiated. The operation of the transmit switch 40 controls the hand unit 22 so that data is derived from the memory in the unit 22 and transmitted through the transmitter 30 and over the line 36 to the central processor 38. When the transmission of data is completed, the hand unit 22 is removed from the transmitter 30, restored to battery power, and can be cleared for the storage of new information by the actuation of a reset key in the keyboard input 26.

An enlarged fragmentary top plan view of the hand unit 22 shown in FIG. 3 illustrates the keyboard input 26 and the visual display 28. The keyboard input 26 includes a conventional ten-key keyboard including ten individual keys 46 which are used to enter digital values into the unit 22. When an enter-search mode controlling switch 48 is in its illustrated enter position and as the operator sequentially operates the keys 46 to enter a plural digit message into the unit 22, these digits are visually displayed in the display unit 28 which is shown as comprising an eight-digit display using seven segment LED's. The displayed digits are shifted right-to-left in the usual manner so that the first entered or most significant digit always appears in the left-hand position. At the end of the message, an end-of-message function key 50 is depressed to store an end-of-message code in the memory following the digits forming the message. The operation of the end-of-message key 50 also terminates operation of the visual display 28 and adds an increment of count in a counter in the unit 22 which accumulates the total number of messages entered into memory.

In the event that an error is made by the operator in entering a digital message into the unit 22, the actuation of a shift function key 52 controls the unit 22 to, in effect, backspace the memory a single step. When the memory has been backspaced this single step, an erase signal is generated to clear the incorrect digit from the memory, and the next actuation of one of the keys 46 enters a correct digit in place of the previously erased digit which can be verified by observing the visual display 28.

When the operator desires to know the total number of messages entered into the memory in the unit 22, a count function key 54 is actuated. The actuation of this key transfers the content of the message count register to the display 28. The total standing in the message counter is not destroyed by this transfer and remains in storage. The message count then can be removed from the display 28.

Since the visual display 28 consumes an appreciable amount of power considering that the unit 22 is powered by battery, it is desirable to automatically terminate the visual display whenever it has persisted more than a given period of time in the event that further operation of the keyboard input means 26 does not result in the controlled termination of this display. Accordingly, the unit 22 includes a timing circuit for automatically terminating the indication provided by the display 28. If, however, the operator desires to renew the indication previously provided by the display 28 after it has been terminated, a recall function key 56 is manually operated, and the indication returns to the display 28 for an additional predetermined time interval. This timing interval is also initiated by actuation of any of the keys 46, 50, 52, and 54.

When the unit 22 is set into its enter mode by actuating the key 48 to its alternate position shown in FIG. 3, the contents of the memory in the unit 22 are made available for transfer to the transmitter 30 or for display in the display unit 28. Each time that the end-of-message key 50 is depressed, a different message in the sequence of messages stored in the memory is transferred to the display unit 28. During this operation, the digits from memory are transferred into the display 28 left justified with the most significant digit appearing in the extreme left-hand position. Thus, if a message includes more than eight digits, the maximum capacity of the unit 28, further digits in the same message can be shifted into the display 28 by actuating the shift key 52. With the unit 22 set in the search mode, the actuation of the shift key 52 shifts the display to the left and does not result in the erasure of information. When the function key 48 is returned to its enter position, the unit 22 is automatically controlled so that the next digit entered in the unit 22 is stored in memory immediately contiguous to the last previously stored digit, regardless of whether one or all of the messages in the memory have been recalled to the display unit 28 or transferred to the transmitter 30. The memory is cleared, and the unit 22 reset to a normal condition by actuating a memory reset key 58.

The hand unit 22 also includes two visible indicators. One indicator 60 becomes illuminated to indicate that for one reason or another, such as an error or a malfunction arising in the unit 22, data can no longer be entered through the keyboard input 26. A second visible indicator or lamp 62 provides an indication that the memory capacity of the unit 22 has been completely utilized. The lamp 62 provides a flashing indication as the memory approaches a full state to advise the operator of this condition. The lamp 62 becomes continuously illuminated when the memory in the unit 22 is filled.

Referring now more specifically to FIG. 4 of the drawings, therein is illustrated in block form the main components of the hand unit 22. In addition to the keyboard input 26 and the display unit 28, the hand unit 22 includes a main memory 64. The memory 64 is a dynamic circulating shift register store defining a plurality of discrete time slots in a repetitive time frame in which each of the time slots is adapted to store a single digit or character of a message in suitable coded form. The unit 22 also includes a display memory 66 which is a dynamic circulating store of substantially smaller capacity than the main memory 64 and operating generally in parallel therewith for storing the digits to be displayed by the display unit 28. A load point counter 68 synchronizes and controls the storage of data from the peripheral input unit 24 and the keyboard input 26 in the main memory 64 and the display memory 66.

The load point counter 68 operates in the same repetitive time frame as the main memory 64 and is slipped a single time slot each time that an entry is stored in the main memory 64 so as to provide an enabling marker to a pair of gate means 70 and 72 that indicates the empty time slot next adjacent the time slot in which is stored the previously entered digit or character. Accordingly, whenever a digit entry is provided from the keyboard input 26 or the peripheral input unit 24, the gates 70, 72 are enabled by the load point counter 68 to supply the input data to the empty time slot in the main memory 64 immediately adjacent the time slot containing the previously entered digit. As noted above, each of these input operations slips the repetitive time frame of the load point counter 68 a single time slot to direct the next entry into the next adjacent empty time slot. The actuation of the shift key 52 with the unit 22 in an enter mode increments the repetitive time frame of the load point counter 68 by a single time slot to permit the erasure of a preceding entered digit.

The display memory 66 receives the digital entries supplied by the keyboard input 26 synchronized with their storage in the main unit 64 by the control exercised by the load point counter 68. As set forth above, the actuation of the end-of-message key 50 terminates the display provided by the display unit 28. The actuation of the next key 46 in the keyboard input 26 effects the clearing of the display memory 66 to receive the next message to be transferred into the main memory 64.

Each actuation of the end-of-message key 50 when the unit 22 is in its enter mode increments the count standing in a message counter 74 so that this counter provides a running total of the total number of messages entered into the main memory 64. Whenever the count key 54 in the keyboard input 26 is actuated, a gating means 76 is enabled to transfer the contents of the message counter 74 to the display memory 66. This permits the display of the message count in the display unit 28. As noted above, the contents of the message counter 74 are read through the gate 76 into the display memory 66. Thus, the total standing in the message counter 74 remains to be incremented as each additional message is stored in the main memory 64. The message counter 74 is cleared on actuation of the main reset key 58.

When the hand unit 22 is converted to its search mode by operating the switch 48 to its search setting (FIG. 3), the hand unit 22 is conditioned to transfer or read the contents of the main memory 64 to either the transmitter 30 or the display 28 through the display memory 66. This transfer is controlled by an output point counter 78. The output point counter 78 operates in the same repetitive time frame as the main memory 64 and in synchronism therewith and provides an output indicator or marker identifying or locating the next most significant digit to be transferred out of the main memory 64. Each time that a digit is read out of the main memory 64, the repetitive time frame of operation of the output point counter 78 is slipped a single time slot so as to indicate the next most significant digit to be withdrawn from the main memory 64.

Assuming that the operator desires to review the messages stored in the main memory 64 by sequential display on the visual display 28, the end-of-message key 50 is actuated to provide an enabling signal for a gate 80 which is also enabled by the output point counter 78 in the time slot containing the most significant digit for display so that this digit is transferred through the gate 80 to be stored in the display memory 66. The control circuit is such that the output point counter 78 is sequentially slipped to transfer digits from the main memory 64 to the display memory 66 until such times as the end-of-message code appears at the output of the main memory. This means that a complete message is transferred from the main memory 64 to the display memory 66 even though the length of the message may exceed the display capacity of the display unit 28. As noted above, the storage capacity of the circulating display memory 66 is substantially in excess of the eight-digit display capacity of the unit 28.

During this operation of the display 28 in the search mode, the message is left justified rather than right justified, as in the enter mode. This means that the most significant character in a message always appears at the extreme left of the visual display 28 (FIG. 3) with the digits of decreasing significance extending to the right thereof, If the length of the message exceeds the display capacity of the unit 28, the shift key 52 can be actuated to shift the entire message one step to the left (FIG. 3) in the windows of the display unit 28 so that the most significant digit is removed from display, and the next digit in the message appears in the extreme right-hand window of the display 28. By sequentially actuating the shift key 52, the entire message can be placed in the visual display 28. The manual actuation of the shift key 52 accomplishes this by adding a single time slot to the repetitive time frame of the display memory 66.

The display 28 and the display memory 66 are cleared on each actuation of the end-of-message key 50, and the unit 22 is controlled to transfer the next message from main memory to the units 66 and 28. This sequential display of successive messages from the main memory on the display unit 28 continues so long as the end-of-message key 50 is actuated. When the operator decides that enough message information has been reviewed, the hand unit 22 can be returned to its enter mode merely by actuating the enter key or switch 48 to its enter setting. When this happens, the control circuitry in the hand unit 22 automatically resets the output point counter 78 to a setting indicating the most significant digit to be supplied to the output of the main memory 64. Further, since the setting of the load point counter 68 relative to the time frame of the main memory 64 has not been changed during the message display operation, the output indication provided by the counter 68 remains at the next adjacent empty time slot in the main memory 64, and the operator can add additional messages to storage in the main memory 64 in the manner described above.

When the contents of the memory 64 are to be transferred to an output device, the hand unit 22 is plugged into the transmitter 30 as described above, and the switch 48 is moved from its search setting to its enter setting. By actuating, for example, the transmit key 40 (FIG. 1), the communication link 36 to the central processor 38 is established, and the output point counter 78 is rendered effective to control an output gate 82 so that the date entires or messages stored in the main memory 64 are transferred through the gate 82 to the transmitter 30 for transmission to the central processor 38. This transmission of information can take place either at a clock rate established by the hand unit 22 or at an external clock rate established by the transmitter 30 in dependence on the known transmission characteristics of the communication link 36. This transmission of information is automatically terminated by the hand unit 22 when the indication provided by the output point counter 78 denoting the most significant character remaining to be transmitted coincides with the indication provided by the load point counter 68 which indicates the next empty time slot. During this transmission, the hand unit 22 is powered by line power derived from the transmitter 30 and the batteries normally used to power the hand unit 22 are isolated from the hand unit logic and charged. Since the readout of information from the main memory 64 is not destructive, the information can be retransmitted as many times as desired. The main memory 64 is cleared and the remaining circuit is reset to a normal condition as described above by operation of the reset switch 58.

As noted above, the transmitter 30 is provided with an independent power supply energized from a conventional line source. The hand unit 22 is powered from batteries during its normal operations, and the unit 22, when plugged into the transmitter 30, is transferred to the line power source while permitting concurrent charging of its batteries. A control circuit indicated generally as 500 (FIG. 5) for carrying out these functions includes a power supply control circuit 502 for the hand unit 22 and a power supply control circuit 504 for the transmitter 30. The logic components in the hand unit 22 are indicated generally as 22A in FIG. 5, and the logic components for the transmitter 30 are indicated as 30A.

Considering the hand unit 22, the logic components 22A thereof in one embodiment constructed in accordance with the present invention require a positive 5 volt potential, a negative 5 volt potential, and a negative 12.5 volt potential. The negative 12.5 volt potential for the components 22A is supplied by a suitable rechargeable battery 506 such as a nickel cadmium battery which is coupled to the logic components 22A through a diode 508. The battery 506 also supplies a negative five volt regulator 510 of conventional construction, the output of which is coupled to the logic components 22A. A second rechargeable battery 512 of a nominal 8.4 volt output is coupled through a diode 514 to the input of a conventional voltage regulator 516 which supplies a positive 5 volt potential to the logic components 22A. Thus, during normal operation of the portable hand unit 22, all of the power reguirements are supplied by the batteries 506 and 512 in the control circuit 502.

Figure 5:
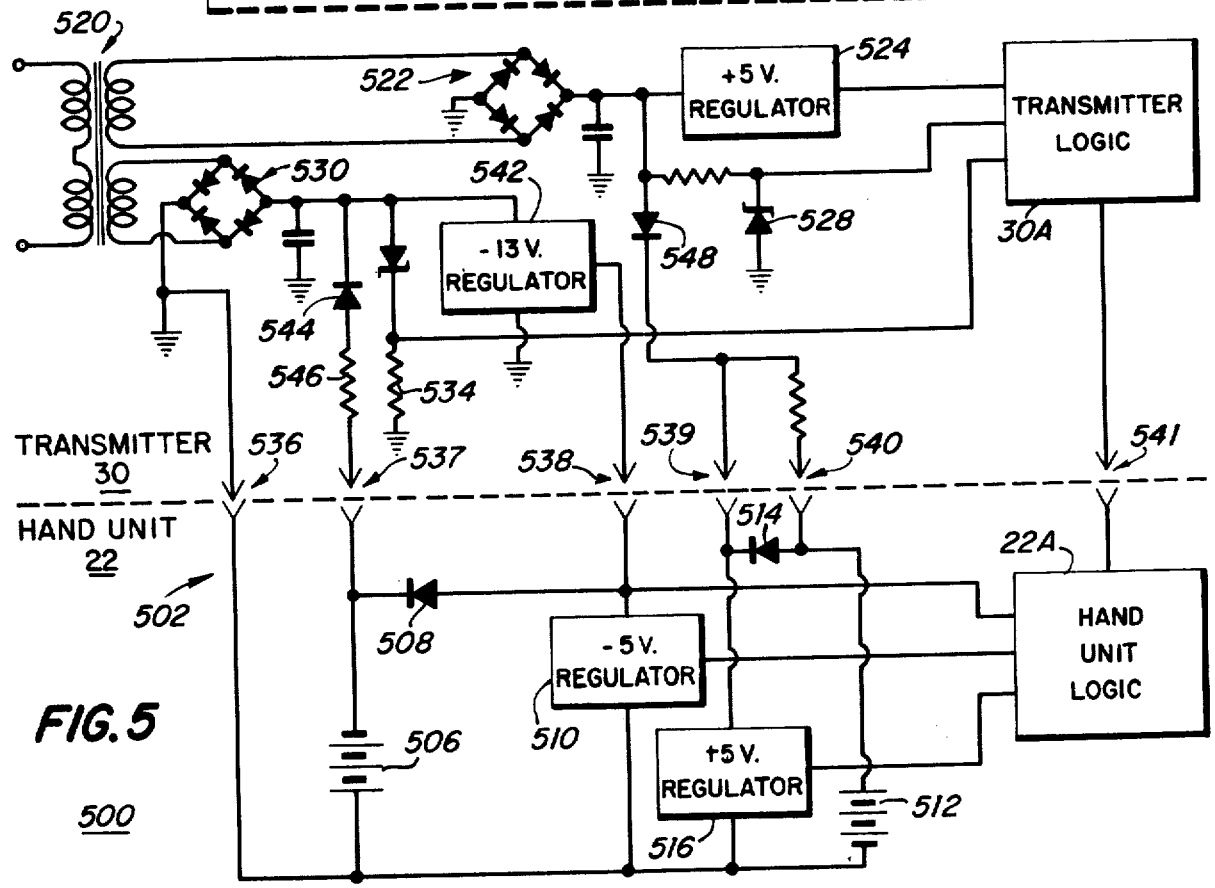
FIG. 5 is a schematic circuit diagram illustrating an arrangement for controlling the transfer of power from a conventional line source to the transmitter and to the batteries and logic components of the hand unit when it is coupled to the transmitter unit.

The logic elements 30A of the transmitter 30 are always powered from a conventional line power source by the control circuit 504. The transmitter logic components 30A in one embodiment constructed in accordance with the present invention require for operation a positive 5 volt potential, a negative 5 volt potential, and a positive 12 volt potential. To supply these operating potentials, the control circuit 504 includes a power transformer 520, the primary winding of which is energized from a suitable alternating current source as by connection thereto by the line cord 34 (FIGS. 1 and 5).

One secondary winding of the transformer 520 is coupled to the input of a fullwave rectifier bridge 522. The output of the bridge 522 is a nominal positive 17 volts which is applied to a conventional 5 volt regulator 524 so that the regulator 524 supplies the logic components 30A with a positive 5 volt potential. The nominal 17 volt potential at the output of the bridge 522 is also forwarded through a series connected resistance element 526 and across a Zener diode 528 to provide a positive twelve volt potential for the logic elements 30A.

A second secondary winding on the transformer 520 is also coupled to the input of a second fullwave rectifier bridge 530 whose output provides a nominal 17 volt potential. This output potential is applied across a series branch circuit including a Zener diode 532 and a resistance element 534 so that a negative 5 volt potential is developed across the resistance element 534 which is supplied to the logic elements 30A.

When the portable or hand unit 22 is plugged into or detachably connected to the transmitter 30 (FIGS. 1 and 2), a series of connectors 536–541 (FIG. 5) couple the circuits 502 and 504 and interconnect the hand unit logic elements 22A with the transmitter logic elements 30A. The connector 536 provides a preliminary make connection so that a ground or reference plane connection is established between the circuits 502 and 504 before the other connections are established. The connector 541 interconnects the logic units 22A and 30A for the transmission of control and information data. When the connections between the circuits 502 and 504 are established, the batteries 506 and 512 in the hand unit 22 are isolated from the hand logic components 22A, and charging paths are established for these batteries. Further, the power requirements of the hand logic components 22A are supplied from the power transformer 520.

More specifically, the negative seventeen volt output of the bridge 530 is also supplied to the input of a negative 13 volt regulator 542 of conventional construction. The output of this regulator is supplied through the connector 538 and directly to the hand unit logic components 22A to provide the negative 12.5 volt potential for these components. The regulator 542 also supplies the regulator 510 to provide the negative 5 volt potential for the hand logic components 22A.

To provide a circuit for charging the negative 12.5 volt battery 506, the connector 536 connects this battery in series with a diode 544 and a resistance element 546 to the negative 17 volt potential provided at the output of the bridge 530. The battery 506 is charged over this circuit, and the drop across the series resistor 546 is such that a suitable charging current is applied to the battery 506. This potential is applied to the cathode of the diode 508. However, the anode of this diode is now held at a negative 13 volts at the output of the regulator 542. Thus, the diode 508 is reverse-biased to completely isolated the battery 506 from any load imposed by the regulator 510 or the hand logic components 22A.

To provide means for supplying the positive five volt potential to the hand logic components 22A, the positive 17 volt output potential from the bridge 522 is forwarded through a diode 548 and the connector 539 to energize the regulator 516. The cathode of the diode 548 is also coupled through a series resistance element 550 and the connector 540 to the battery 512 to provide a circuit for charging this battery to its 8.4 volt potential, the drop across the resistance element 550 being such as to control charging current due to the seventeen volt potential provided by the bridge 522. Since the cathode of the diode 514 is held at approximately 17 volts by the output of the bridge 522 and since the anode of this diode is held at a nominal positive 8.4 volt potential, the diode 514 is back-biased to isolated the battery 512 from any load imposed by the 5 volt regulator 516.

In this manner, the batteries 506 and 512 are recharged during the interval in which the hand unit 22 is plugged into the transmitter 30. During this interval, the hand unit logic components 22A are directly powered from the line power source made available in the control circuit 504 associated with the transmitter 30. It should be noted that if the connection over the line cord 34 to the conventional power source is interrupted during the interval in which the hand unit 22 is plugged into the transmitter 30, the control circuits 502 and 504 prevent the loss of stored data and the imposition of any additional loads on the batteries 506 and 512. A loss of power in the circuit 504 removes the reverse-bias from the diodes 508 and 514, and the batteries 506 and 512 immediately become effective to supply power to the hand logic components. In addition, the diodes 544 and 548 isolate the batteries 506 and 512 from any drain imposed by the transmitter 30.

Further, there is no possibility of loss of information in memory in the hand unit 22 occasioned by connecting the hand unit 22 to or disconnecting this unit from the transmitter 30. This is true because the batteries 506 and 512 are continuously effective to supply the power requirement of the hand logic components 22A until such time as the diodes 508 and 514 are back-biased. These diodes cannot be back-biased until the power for operating the logic units 22A is provided by the control circuit 504 associated with the transmitter 30.

The circuitry of the hand-held or portable unit 22 is illustrated in FIGS. 6–10 of the drawings. These circuits are illustrated in simplified logic form using AND and OR logic to simplify the description of the invention. In one unit 22 made in accordance with the present invention, the circuitry was constructed using components implementing functions in NAND and NOR logic. However, the illustrated AND and OR logic can be converted to NAND and NOR logic by the exercise of nothing more than the expected skill of a designer familiar with digital logic. In addition, the NAND and NOR and related logic components from which the embodiment of the unit 22 was actually constructed used complementary symmetry MOS devices (COS/MOS) manufactured and sold by the Solid State Division of RCA in Summerville, New Jersey. The family of devices used is identified as the CD 4000 A Series of logic components. The use of the COS/MOS devices is particularly desirable because these devices require very little power for operation when compared, for example, with TTL logic devices, and the hand unit 22 is specifically designed for portable, battery-powered operation.

In the following description, the signals generated by the various logic components and used for control functions are designated by alphabetical or alphanumeric designations. Throughout the description, the corresponding signal in an inverted form is indicated by the same designation followed by "/". As an example, a signal DC1 (FIG. 6) generated by the keyboard input 26 is thus identified, and its inverted signal is identified as DC1/. Further, certain of the signals generated by the logic circuitry in one of the units, such as the hand unit 22, may also be used in the transmitter 30, and signals generated in the transmitter 30 may be used in the hand unit 22. These signals which are used or generated in more than one of the units 22, 24, and 30 are identified by a signal designation of the type referred to above followed by an asterisk. As an example, a signal REQOU* is generated in the transmitter 30 and is used in the hand unit 22.

The general practice followed in appending the asterisk is to use the asterisk in a signal designation where the signal is generated as an output. The asterisk is also used in signal input designations where the signal originates externally. The asterisk is not used in those instance where a signal generated in one unit is used as an input signal in the same unit. As an example, the signal REQOU is designated REQOU* in FIG. 11 where generated in the transmitter 30 and as REQOU* in FIG. 6 where the signal is used in the hand unit 22. However, this signal is designated as REQOU in FIG. 11 where it is used as an input internal to the transmitter 30.

Figure 7:
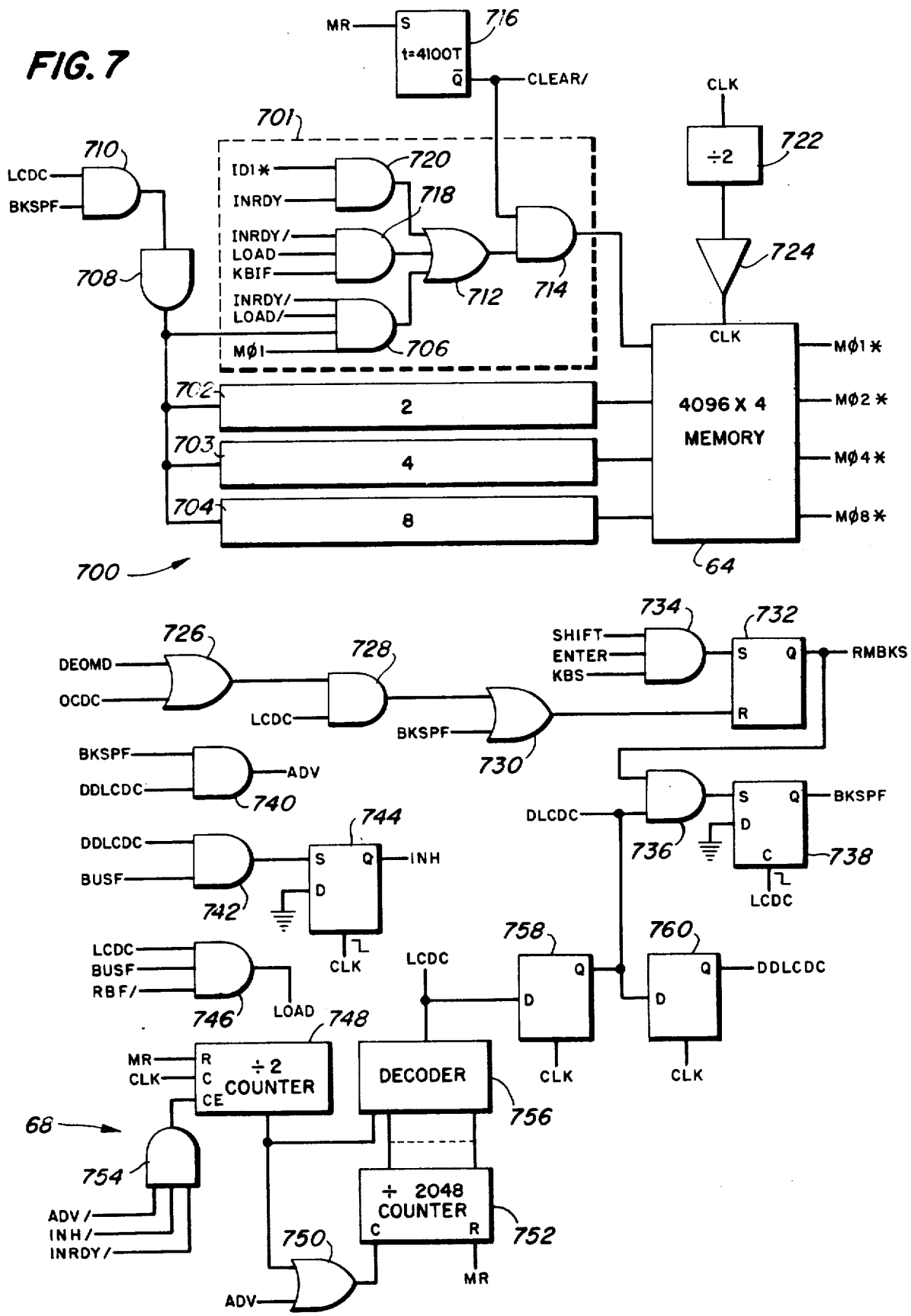

One of the basic units of the hand unit 22 is the main memory 64 (FIG. 7). This device is a dynamic shift register with its outputs returned to its inputs to provide a dynamic circulating memory. In the illustrated hand unit 22, the memory 64 has a capacity of 4096 words each comprising four bits of binary weights 1, 2, 4, and 8. Although the memory 64 can be constructed of a number of different known components, in one embodiment of the invention the main memory 64 was constructed using sixteen Intel Model 1404 P channel registers with individual capacities of 1024 bits arranged in a four-by-four array to provide the desired storage capacity of 4096 four-bit words. The main memory 64 can be constructed so as to provide a memory of greater or lesser length with a greater or lesser number of bit channels.

To provide for the circulation of data through the memory 64 as well as means for entering data into or cancelling data from the memory 64, there is provided a control circuit indicated generally as 700 which generally corresponds to the gating arrays 70, 72 (FIG. 4). The control circuit 700 (FIG. 7) comprises four input gate arrays 701–704, each individual to one of the bit channels in the main memory 64 corresponding to the binary weights 1, 2, 4, and 8, respectively. The gating array 701 is illustrated in detail, and the gating arrays 702–704 are similar except for the binary significance of the signal input. The outputs from the main memory 64 comprise the signals M01, M02, M04, and M08 representing the binary weights 1, 2, 4, and 8, respectively. These signals rise to a more positive level indicating the presence of a binary 1 bit and remain at a lower or reference level to represent a binary 0 bit.

To provide for the normal recirculation of data in the memory 64, an AND gate 706 is provided in the gating array 701 and a corresponding gate is provided in each of the arrays 702–704. One input to the AND gate 706 comprises the output signal M01 for the corresponding channel of the memory 64. The other three inputs to the gate 706 are normally supplied with a more positive signal from the output of an AND gate 708 and with more positive signals INRDY/ and LOAD/. Accordingly, the gate 706 is normally enabled to permit the output signal M01 from the corresponding channel of the main memory 64 to be forwarded through the AND gate 706 and an OR gate 712 to one input of an AND gate 714. The other input of the gate 714 is supplied with a clear signal CLEAR/from the output of a monostable or one-shot circuit 716. The signal CLEAR/ is normally at a high enabling level so that the AND gate 714 returns the output signal M01 from the memory 64 to its input. This provides for the normal recirculation of signals through the binary 1 channel of the main memory 64 and corresponding gates in the gate arrays 702–704 provide for normal recirculation of the signals in the remaining three channels of the memory 64.

Since the main memory 64 is a dynamic circulating memory, the basic time reference for all of the logic in the hand unit 22 is set by the recirculation period of the memory 64. This basic reference comprises a repetitive time frame formed of 4096 individual time slots, each adapted to store a data entry composed of a four-bit digit or character. The repetitive time frame set by the memory 64 can have a number of different absolute time values which is determined by the frequency of the clock signal used to control the circulation of data within the memory 64. Thus, the basic time cycle of the hand unit 22 is set by the frequency of a clock signal CLK which can be adjusted to have several values. Since the memory 64 has the characteristic that a shift occurs on both the leading the trailing edges or the positive-going and negative-going edges of a clock signal, the basic clock rate established by the signal CLK is reduced by a factor of two in a divide-by-2 counter 722, the output of which is forwarded through a driver 724 to the clock input of the memory 64. Thus, the memory 64 provides a repetitive time frame consisting of 4096 discrete time slots, and the repetitive time frame can have an absolute value varying in dependence on the frequency of the clock signal CLK.

A second primary control component in the hand unit 22 is the load point counter 68 (FIGS. 4 and 7). This load point counter 68 includes a divide-by-2 counter 748, the output of which is coupled through an OR gate 750 to the counting input of a divide-by-2048 counter 752. The counter 748 includes a count enable input terminal normally supplied with an enabling potential at the output of an AND gate 754, a counting input terminal supplied with the clock signal CLK, and a main reset terminal supplied with a main reset signal MR. The counter 752 in addition to its counting input terminal includes a main reset terminal supplied with the signal MR. The single output of the counter 748 is supplied as one input to a decoder 756. The outputs of the counter 752 are supplied to the other inputs of the decoder 756. The single output of the decoder 756 provides a signal LCDC only when all of the stages of the counters 748 and 752 are in their set condition. This is the condition to which the counters 748 and 752 are set by the main reset signal MR.

The counter 748 is driven by the clock signal CLK, and the counter 752 is driven by the output of the counter 748. Thus, the signal LCDC rises to a more positive potential for a clock period after each 4096 clock signals have been received. Therefore, the load point counter 68 comprising the counters 748 and 752 normally operates in exactly the same repetitive time frame as the main memory 64 and provides the output signal LCDC in only one time slot for each repetitive time frame. Further, the absolute length of the time frame can be of different absolute time durations in dependence on the frequency of the clock signal CLK.

Certain control functions in the hand unit 22 are performed during successive time slots following the generation of the load point control signal LCDC. Accordingly, a pair of D type flip-flops 758 and 760 are provided, each of which is supplied with the clock signal CLK at its clock input. The signal LCDC is supplied to the input of the flip-flop 758 so that this flip-flop is set one clock period following the generation of the signal LCDC. The output signal DLCDC from the flip-flop 758 is also applied to the D input terminal of the second flip-flop 760. Accordingly, on the second clock signal CLK following the generation of the signal LCDC, the flip-flop 758 is reset, and the flip-flop 760 is set to generate the signal DDLCDC. On the next following clock signal CLK, the flip-flop 760 is reset.

Another primary control assembly in the hand unit 22 is the output point counter 78 (FIGS. 4 and 10). The output point counter 78 includes a divide-by-4096 counter 1000 whose output is coupled to a decoder 1016. The counter 1000 includes a count enable terminal coupled to the output of an AND gate 1020 which normally supplies a more positive enabling potential to the count enable terminal. A count terminal of the counter 1000 is supplied with the clock signal CLK. A reset terminal for the counter 1000 is supplied with an output signal from an OR gate 1018, one input to which is the main reset signal MR. When the main reset signal MR is applied through the OR gate, the counter 1000 is set to a normal condition in which all of the counting stages are set. This condition is decoded by the decoder 1016 to provide a more positive signal OCDC for a one clock pulse period. Since the counter 1000 is advanced through a complete cycle of operation by 4096 clock signals CLK, this counter operates in the same repetitive time frame as the main memory 64 and supplies the output signal OCDC once for each cycle of revolution or each time frame of the main memory 64. As set forth above, the absolute time duration of the repetitive time frame varies in accordance with the frequency of the clock signal CLK.

As set forth above, the hand unit 22 includes a control for operating the main memory 64 at a slow speed during normal operation so as to reduce the power required to operate the unit 22. Alternatively, when active operations are performed with respect to storing data in or removing data from the main memory 64, the clock frequency is substantially increased, and this increased clock frequency is maintained during the period in which active operations are performed. This control is exercised by a control circuit indicated generally as 630 (FIG. 6) which includes a high speed clock signal source shown as a 1 MHz oscillator 6332 and a normally effective low clock frequency source 634 shown as a 1 KHz oscillator. In the normal condition of the hand unit 22, when data is being recirculated through the main memory 64, the output of an OR gate 636 is at a low level to inhibit one input to a gate 640, and this low level signal is inverted by an inverter 638 to enable one input to an AND gate 642. Another input to the gate 642 is enabled at the output of an inverter 646 due to the low level potential normally supplied at the output of an AND gate 644. The output of the low frequency clock pulse source 634 is coupled to the remaining input of the AND gate 642 and is repeated to the connected input of a gate 650. The lower input to the OR gate is coupled to the output of an AND gate 648, and the uppermost input to this gate is coupled to the output of the inhibited AND gate 640. Thus, the low frequency signals provided by the oscillator 634 normally provides the clock signal CLK.

When, however, any one of the signals shown as inputs to the OR gate 636 rises to a high level, the output of this gate rises to a high level and is effective through the inverter 638 to inhibit one input to the AND gate 642. This inhibits the transfer of the low frequency clock signals from the oscillator 634 to the output gate 650. The high level at the output of the OR gate 636 completes the enabling of the gate 640 so that the high frequency clock signals provided by the oscillator 632 are forwarded through the gates 640 and 650 to provide the high frequency clock signal CLK.

Thus, the control circuit 630 insures that the power consumption of the hand unit 22 is maintained at as low a level as possible by recirculating data through the main memory 630 using the low clock rate at all times except when a demand for the high frequency clock is generated by placing one of the inputs to the OR gate 636 at a high level. Further, the control circuit 630 is shown in simplified form to facilitate an understanding of its operation. In an embodiment constructed in accordance with the present invention, the usual circuits for preventing transfer between clock rates in the middle of clock pulses are included. In addition, to prevent races between several components operating on the leading or trailing edges of the clock signals CLK, the circuit 630 can include conventional circuits for generating phase-displaced clock signals to sequence operations where desired.

MANUAL ENTRY OF DATA INTO THE HAND UNIT 22

Assuming that the hand unit 22 is to be placed in operation to store data entries, the operator actuates the two-position enter-search switch 48 (FIGS. 3 and 6) to its enter position. In this enter position, a low level potential is applied to the set input of a flip-flop 652 (FIG. 6) and a more positive potential is applied to the reset terminal of this flip-flop. This resets the flip-flop 652 to provide a more positive signal ENTER* and a low level signal SEARCH. The outputs of the flip-flop 652 are also coupled to a pair of edge detectors 654 and 656. When the flip-flop 652 is reset, the edge detector 656 supplies a signal TENT indicating that the hand unit 22 has just been placed in its enter mode. The more positive signal TENT is coupled through an OR gate 658 to provide a signal SRB. Similarly, when the flip-flop 652 is set, the edge detector 654 provides a more positive output which is coupled through the OR gate 658 to provide the signal SRB.

Figure 6:
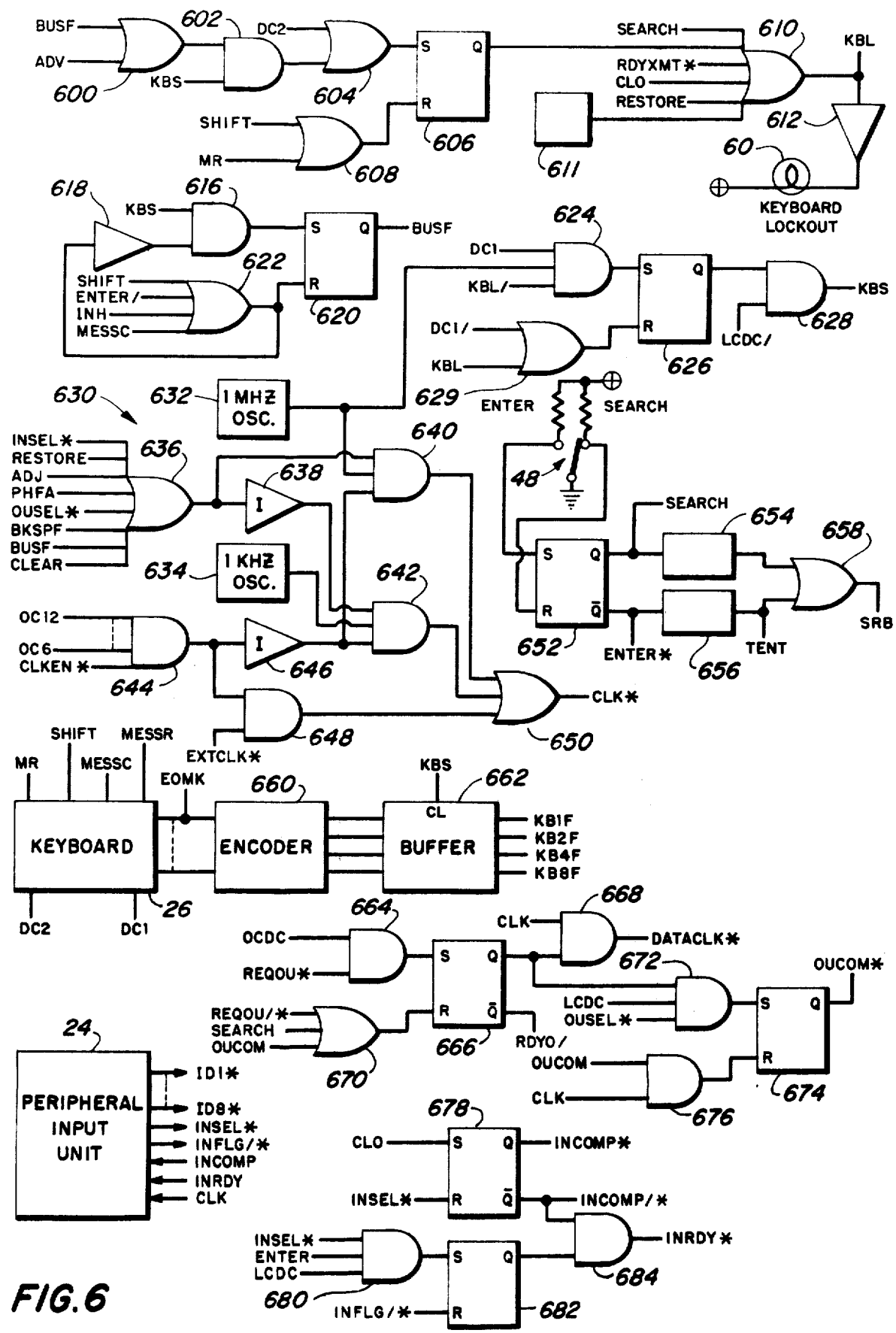

The operator next clears and restores the hand unit 22 to a normal state by actuating the memory reset key 58 (FIG. 3). The actuation of this key provides the signal MR at the keyboard unit 26 (FIG. 6). The signal MR is the master reset for the hand unit 22 and operates to clear the main memory 64 of any data entries previously stored therein, to restore the load point counter 68 and the output point counter 78 to a position synchronized with the main memory 64, and restores numerous other control components of the hand unit 22 to a normal condition. As set forth above, the application of the main reset signal MR to the couners 68 and 78 sets the counters 748, 752 (FIG. 7) and 1000 (FIG. 10) to an all-set condition in which the decoders 756 and 1016 provide for one clock period the two marker or indicator control signals LCDC and OCDC, respectively. Thus, when the hand unit 22 is reset, the signals LCDC and OCDC are synchronized in a relation in which the signals are concurrent with each other for a single clock period or time slot.

With regard to the clearing of the main memory 64 (FIG. 7), the signal MR sets the monostable circuit 716 to provide a more negative signal CLEAR/. This inhibits the gate 714 and the corresponding gates in the gate arrays 702-704 so that an inhibit is applied to the input of the circulating memory 64 for the time duration of the monostable circuit 716. The more positive signal CLEAR is applied as one input to the OR gate 636 to control the circuit 630 so that the high frequency oscillator 632 provides the clock signal CLK. This means that data is clocked out of the memory at the high frequency rate so that the memory can be cleared as quickly as possible. As indicated in FIG. 7 of the drawings, the delay interval of the timing circuit 716 is approximately 4100 clock periods or time slots to insure the complete erasure of data from the memory 64. When the circuit 716 times out, the signal CLEAR/ rises to a positive level to enable the gate 714, and the signal CLEAR drops to a low level so that the clock control circuit 630 returns the signal CLK to its low frequency.

It will be appreciated that the signal MR which resets the load point counter 68 and the output point counter 78 does not persist as long as the signal CLEAR so that these two counters are advanced from their reset positions during the clearing of the main memory. However, since the memory 64 has been completey erased when the circuit 716 times out, the signals LCDC and OCDC will appear concurrently and in synchronized coincidence with one of the low frequency clock signals CLK defining a first empty time slot in the main memory 64. This time slot is more or less randomly selected on each resetting of the hand unit 22 in dependence on the state of the counters 68 and 78 at the time that the clock control circuit 630 switches back to provide the low frequency clock signal CLK. Thus, the signals LCDC and OCDC will now appear once during each repetitive time frame marking precisely the same time slot n the repetitive time frame as being empty and available for storage of the first digit.

To store the first digit in the main memory 64, the operator manually actuates one of the entry keys 46 (FIG. 3) so that the keyboard input 26 (FIG. 6) provides marking on a selected one of a number of output leads extending to the inputs of an encoder 660. The encoder 660 encodes the marking condition into a suitable binary coded entry for the main memory 64. As an example, the encoder 660 can provide binary coded decimal marking at its output to the input of a keyboard buffer 662.

The operation of one of the keys 46 also controls the keyboard input 26 to provide a signal DC1 indicating that a single key has been operated. This signal enables one input to an AND gate 624. Another input to this gate is supplied by the output of the high frequency oscillator 632. The third input to the gate 624 is normally enabled by a signal KBL/ indicating that operation of the keyboard 26 is not inhibited. Thus, the gate 624 is fully enabled to set a flip-flop 626. The output of the flip-flop 626 enables one input to an AND gate 628, the other input of which is supplied with the signal LCDC/. Thus, if the load point counter 68 is not in a setting corresponding to the marked empty time slot in which the first digit entry is to be stored, the gate 628 is fully enabled to provide a more positive keyboard strobe signal KBS.

This signal KBS is applied to the clock input of the keyboard buffer 662 and supplies coded signals KB1F, KB2F, KB4F, and KB8F to the corresponding inputs of the loading gates in the gate arrays 701–704 at the input to the memory 64. More specifically, the signal KB1F is applied to one input of the gate 718 in the gate array 701, and the remaining signals are applied to corresponding gates in the gate arrays 702–704. At this time, the upper input to the gate 718 and to the corresponding gates in the other arrays 702–704 are enabled by the signal INRDY/. However, the gate 718 and the corresponding gates are inhibited by a low level signal LOAD becaue the memory 64 is not to be loaded until such time as the time slot is reached that is marked by the signal LCDC as being the empty time slot in which the first data entry or character is to be stored.

The signal KBS is also applied to one input of an AND gate 616. The lower input to this gate is enabled by an inverter 618 because all of the inputs to a connected OR gate 622 are at a low level. When the gate 616 is fully enabled, a connected flip-flop 620 is set to provide a more positive busy function signal BUSF. The signal BUSF comprises one of the inputs to the OR gate 636 in the clock control circuit 630. Accordingly, the clock signal CLK now appears at the high frequency desirable for effecting data operations.

The signal BUSF also is applied to one input of a gate 746. Another input to this gate is enabled by a signal RBF/. Accordingly, when the counters 748 and 752 forming the load point counter 68 reach the end of the repetitive time frame, the decoder 756 provides the more positive signal LCDC marking the time slot in which the first data entry is to be loaded. At this time, the gate 746 is fully enabled to provide the more positive signal LOAD. This signal completes the enabling of the gate 718 in the gate array 701 and the corresponding gates in the gate arrays 702–704 so that the coded first digit is supplied to the input of the memory 64 in the time slot marked by the signal LCDC. At the time that the digit is entered into the memory 64, the inverted signal LOAD/ is at a low level to inhibit the gate 706 and prevent recirculation of data in the time slot in which the first digit is being entered. By using the signal BUSF to control the circuit 630 to provide the high frequency clock signal CLK, both the main memory 64 and the load point counter 68 are advanced as quickly as possible to the point at which the signal LCDC is generated to effect the entry of the first digit. This time interval will be rather short inasmuch as the high frequency clock signal appears at a 1 MHz rate, and the maximum waiting time can comprise no more than 4096 time slots or clock signals CLK.

On the trailing edge of the signal DC1, the signal DC1/ becomes more positive and is effective through an OR gate 629 to reset the flip-flop 626. This applies an inhibit to one input to the gate 628 and terminates the signal KBS so that the output of the keyboard buffer 662 is inhibited.

Since the data entry has been stored in the empty time slot marked by the signal LCDC, it is necesary to adjust the setting of the couner 68 so that the signal LCDC now appears indicating the empty time slot next adjacent the one containing the just entered digit. This control is effected by a gate 742 having one input enabled by the signal BUSF. As set forth above, the signal DDLCDC becomes more positive two clock periods following the signal LCDC. When the signal DDLCDC becomes positive, the gate 742 is fully enabld and a D type flip-flop 744 is set to provide a more positive inhibit signal INH. At this time, a signal INH/ forming one input to the AND gate 754 drops to a low level so that a low level potential is applied to a count enable terminal of the counter 748. When the next clock signal CLK appears, the counter 748 cannot be advanced. The trailing edge of this next clock signal toggles the flip-flop 744 to a reset state due to the continuous connection of the D input terminal to ground, thereby terminating the inhibit signal INH. This reestablishes the full enabling of the gate 754 so that subsequent clock signals CLK are effective to advance the counter 748 and thus the counter 752.

All of the clock signals applied to the counter 1000 in the output point counter 78 and to the main memory 64 have been effective to advance these components, but one of the clock signals CLK has been inhibited at the input to the counter 748. This means that the output indicator signal OCDC now tracks the time slot containing the first entered digit in the memory 64, and the load point counter 68 has been slipped a single clock signal CLK or time slot so that it now marks or indicates the time slot next adjacent the one containing the previously entered digit.

The signal INH is also used to effect the resetting of the flip-flop 620 to remove the busy function signal BUSF. More specifically, the signal INH which is positive for one clock period is effective through the OR gate 622 and the inverter 618 to apply an inhibit to one input of the gate 616. The more positive potential at the output of the OR gate 622 also resets the flip-flop 620 to place the signal BUSF at a low level. This change in the state of the signal BUSF applies an inhibit to the gates 742 and 746 to prevent the generation of signals INH and LOAD, respectively. Further, the low level of the signal BUSF controls the OR gate 636 so that the control circuit 630 drops the clock signal CLK to its low frequency for circulating the entered digit through the main memory 64.

After the cycle in which a signal INH causes the repetitive time frame of the load point counter 68 to slip a single time slot, the main memory 64, the load point counter 68, and the display point counter 78 operate in the same repetitive time frame with the signal OCDC occurring simultaneously with the time slot containing the entered digit and with the signal LCDC occurring during the next adjacent time slot to the one containing the previously entered digit. Manual actuation of another one of the keys 46 enters an additional digit in the manner described above, during which the load point counter 68 is slipped a single time slot in the repetitive time frame, considered relative to the repetitive time frame of the main memory, so that the signal LCDC indicates as empty and available to receive the next digit the time slot immediately adjacent the time slot in which the second digit is stored. The signal OCDC remains synchronized with the initial repetitive time frame of the main memory 64 indicating the first entered digit as being the most significant digit to be supplied to an output. This operation continues until such time as the operator has keyed all of the digits comprising the first message into the main memory 64.

At this time, the end-of-message key 50 is manually depressed to provide the signal EOMK at the output of the keyboard input 26. The signal EOMK produces control functions with regard to the display 28 as set forth in detail below. This control code is also encoded by the encoder 660 and stored in a time slot in main memory 64 to mark the end of the string of digits comprising the first message. Thus, the load point counter 68 is also slipped an additional time slot in its repetitive time frame so as to mark the next adjacent time slot for receipt of the next entered digit. The end-of-message code is stored in the same manner as a digit but with a distinct code. The operator can then enter the digits of the next message.

The operation of the end-of-message key 50 and the accompanying generation of the signal EOMK also increments the message counter 74 (FIGS. 4 and 8) in which is stored the total number of messages stored in the main memory 64. The message counter 74 includes three conventional decade counters 864, 866, and 868 for storing the units, tens, and hundreds digits of the number of messages stored. These three counters are reset to zero by the main reset signal MR. Three groups of output signals AA—DD, EE–HH, and JJ–MM provide BCD outputs in accordance with the values stored in the counters 864, 866, and 868. THe units counter 864 is incremented by an AND gate 862 whose three inputs comprise the signals KBS, ENTER, and EOMK. Thus, a count is added to the units counter 864 when the unit 22 is in its enter mode and the end-of-message key 50 is operated to provide the keyboard strobe signal KBS and the end-of-message signal EOMK.

Assuming, however, that the operator by inspection of the visual display 28 determines that an incorrect digit has been entered, he then operates the shift key 52 (FIG. 3) to cause the cancellation of the incorrect digit. More specifically, when the shift key is actuated, the keyboard input 26 (FIG. 6) provides a more positive output signal SHIFT. This signal is not encoded by the encoder 660 and does not comprise a date entry. However, the operation of the shift key 52 does control the keyboard input unit 26 to provide the signal DC1 which, in turn, provides the keyboard, strobe signal KBS. The busy function signal BUSF cannot be provided because the signal SHIFT is effective through the OR gate 622 to hold the flip-flop 620 in a reset state. This prevents generation of the signals LOAD and INH used in loading an entry into the memory 64.

However, the signals SHIFT, ENTER, and KBS are all now at a more positive level and complete the enabling of an AND gate 734 so that a flip-flop 732 is set to provide a more positive signal RMBKS. This signal enables one input to an AND gate 736. When the load point counter 68 reaches the time at which the signal LCDC is generated, an entry in the empty time slot is not made because of the low level of the signal BUSF. One clock period or one time slot following this signal LCDC, the signal DLCDC becomes more positive to complete the enabling of the gate 736, and a flip-flop 738 is set to provide a more positive backspace signal BKSPF. This signal is effective through an OR gate 730 to reset the flip-flop 732 and terminate the signal RMBKS.

The signal BKSPF comprises one input to the OR gate 636 so that the clock control circuit 630 now renders the high frequency oscillator 63 effective to provide the high frequency clock signal CLK. In addition, the signal BKSPF enables one input to an AND gate 740. Thus, following an additional clock signal CLK, the signal DDLCDC becomes more positive to complete the enabling of the gate 740 and to provide a more positive advance signal ADV. The signal ADV is effective through the OR gate 750 to directly supply a count to the input of the counter 752. The inverted advance signal ADV/ inhibits the gate 754 so that the next following clock signal CLK cannot advance the counter 748. With the advance of the counter 748 being inhibited and with a count being directly applied into the next highest input stage, i.e., the input to the counter 752, the load point 68 has, in effect, been advanced a single time slot relative to the repetitive time frame of the memory. Thus, during the next cycle the load point indicating signal LCDC will appear concurrently with the previously recorded or entered digit.

Therefore, when the signal LCDC next appears, it enables the upper input to an AND gate 710. The lower input to this gate is enabled by the signal BKSPF. The more positive output provided at the output of the gate 710 is forwarded through an inverter 708 to provide an inhibit to the gate 706 in the gate array 701 and to the similar gates in the gate arrays 702–704. Since the gate 706 is, as set forth above, the gate through which data normally recirculates through the memory 64, the digit previously written into the last time slot is erased therefrom. On the trailing edge of the signal LCDC, the flip-flop 738 is reset because the D input terminal to this flip-flop is continuously strapped to ground. This drops the signal BKSPF to a low level and removes the enabling from the gate 710 and the continuous reset from the flip-flop 732. The load point counter 68 now operates in synchronism with the repetitive time frame of the main memory 64 so that the time slot from which the digit was erased is marked as the next empty time slot for receiving the next digit to be entered. Thus, the operator can now enter a correct digit in place of the one previously determined to be erroneous and now erased from the main memory 64. This backspace function initiated by the actuation of the shift key 52 does not affect the setting of the output point counter 78, and the signal OCDC remains in the position indicating the first digit stored in the main memory 64.

The hand unit 22 includes certain protective circuits for preventing a backspace function which would result in incorrect or abnormal operation of the hand unit 22. More specifically, this control is exercised by a pair of gates 726 and 728 and the gate 730 whose output is connected to the reset terminal of the flip-flop 732. In the first place and as noted above, when the hand unit 22 is reset to its normal state, the signals OCDC and LCDC used to mark the first digit in storage and the next slot to receive a digit, respectively, occur during the same clock signal CLK or in the same time slot. When this condition occurs, the OR gate 726 and the AND gate 728 provide a more positive potential through the OR gate 730 to hold the flip-flop 732 in a reset condition. This prevents the establishment of a backspace condition. In the second place, provisions are made for insuring that the operator cannot backspace into the end-of-message code terminating the preceding message in the memory 64. If this occurs, the identity of the preceding message would be lost, and any further digits supplied by the operator would appear on readout as a continuation of the preceding message.

To achieve this control, the hand unit 22 includes a decoder 1022 (FIG. 10) whose inputs comprise the output signals M01, M02, M04, and M08 from the output of the memory 64. The decoder 1022 provides a more positive output signal DEOM whenever an endof-message code appears at the output of the memory 64. A time delay unit 1024 provides a more positive signal DEOMD one clock period of time slot following the appearance of the end-of-message code at the output of the memory 64. Therefore, whenever the signal DEOMD appears concurrently with the signal LCDC, it means that any attempt to advance the load point counter 68 a single time slot would result in the signal LCDC appearing concurrently with an end-of-message code and would, in the event of a backspace function, result in the erasure of the end-of-message code. Accordingly, whenever the signals LCDC and DEOMD appear concurrently, the gates 726, 728, and 730 apply a reset signal to the flip-flop 732 to prevent its setting and the establishment of the conditions necessary to achieve a backspace and erasure in the manner described above.

The operator can enter as many digits and as many messages as desired in the manner described above so long as the storage capacity of the main memory 64 is not exceeded. The hand unit 22 includes means for automatically detecting the approach of a completely filled state of the memory 64 and for advising the operator of this fact using the memory full indicator 62 (FIGS. 3 and 10). This is automatically done by comparing the setting of the load point counter 68 which indicates the next slot into which a data entry is to be written and the setting of the output point counter 78 which indicates the first slot in which a digit is recorded. As set forth above, the time at which the signal LCDC appears marking the next empty time slot moves away within the repetitive time frame of the memory 64 from the setting of the counter 78 as more and more digits are entered because the setting of the counter 78 remains in synchronism with the initial repetitive time frame of the main memory 64. When the memory is completely filled, the signal LCDC would move back in the coincidence with the signal LCDC indicating that the signal LCDC has slipped the total number of time slots comprising the repetitive time frame. The approach of this condition is used to signal the operator that the memory 64 is rapidly approaching a filled state.

More specifically, the counter 1000 in the output counter 78 includes a series of parallel outputs providing signals OC4–OC12. In the reset state of the counter 78, all of these signals are at a more positive potential and will all return to a more positive potential once during each repetitive time frame as the counter 1000 approaches the time at which the output indicator signal OCDC is generated.

The signals OC6–OC12 comprising the outputs from the higher ordered stages all become positive to complete the enabling of a gate 1026 to provide a more positive output signal NOC* 32 time slots before the signal OCDC is generated representing the position of the first recorded digit. The signal NOC* enables one input to an AND gate 1028. If the hand unit 22 is in an enter mode, the signal ENTER is at a positive level. Thus, when the signal LCDC indicating the next time slot in which data is to be recorded is only 32 time slots from the first recorded digit, the gate 1028 is fully enabled to set a flip-flop 1030. The setting of the flip-flop 1030 provides a more positive signal NC.

This signal enables one input to a gate 1038, the other input of which is coupled to the output of a 10 Hz oscillator 1036. Accordingly, the output of the gate 1038 provides a 10 Hz signal through an OR gate 1040 and a lamp driver 1042 for flashing the lamp 62. This flashing indication advises the operator that only 32 empty time slots remain in the memory 64.

When the operator terminates the message that is being recorded at the time that the flip-flop 1030 is set and the lamp 62 is flashed, the operation of the end-of-message key 50 provides the signal EOMK. This signal is forwarded through an OR gate 1046 to provide an enabling signal to the lower input of an AND gate 1048. The upper input to this gate is enabled by the signal NC so that the gate 1048 sets the flip-flop 1050. The setting of the flip-flop 1050 provides a more positive signal CLO. This signal is forwarded through the OR gate 1040 to control the lamp driver 1042 to provide continuous illumination of the lamp 62. This means that the operator, on completing any message within the last 32 time slots of the depletion of the storage capacity of the memory 64, receives a continuous illumination from the lamp 62 indicating that further entries may not be made.

In addition, the hand unit 22 also positively prevents the operator from making additional entries into the main memory 64 at this time. More specifically, the hand unit 22 includes an OR gate 610 to which the signal CLO is provided. The more positive signal CLO is effective through the OR gate 610 to provide a more positive keyboard latch signal KBL. This signal is also forwarded through a lamp driver 612 to provide continuous illumination of the keyboard lockout lamp 60 (FIGS. 3 and 6). The illumination of the lamp 60 advises the operator that the keyboard input 26 can no longer be used to enter data into the hand unit 22. As an example, the more positive signal KBL is forwarded through the OR gate 629 to hold the flip-flop 626 in a reset condition. This prevents the generation of the keyboard strobe signal KBS and thus the entry of further data into the manner described above.

Referring back to the circuitry shown in FIG. 10 and in the event that the message being entered by the operator at the time that the flip-flop 1030 is set extends more than twenty-four digits beyond the 32 time slot warning point, i.e., to a point at which only eight time slots remain, the signals OC4, OC5, and LCDC all become positive to complete the enabling of a gate 1044. The more positive output from this gate is forwarded through the OR gate 1046 and the AND gate 1048 to again set the flip-flip 1050. This results in the generation of the signal CLO which in turn positively inhibits the further entry of data through the keyboard unit 26 and causes continuous illumination of both the keyboard lockout latch 60 and the memory full lamp 62.

The flip-flops 1030 and 1050 and the circuits controlled thereby are reset to normal states to terminate the illumination of the lamps 60 and 62 when the hand unit 22 is reset by manual actuation of the memory reset key 58. As set forth above, this also clears the main memory 64 and resets to coincidence the markers provided by the signals LCDC and OCDC supplied from the load point counter 68 and the output point counter 78, respectively.

DIPLAYING DIGITS ON A DISPLAY 28 ENTERED FROM THE KEYBOARD 26

As set forth above, as digits are entered into the main memory 64 using the keyboard input 26, these digits are entered substantially in parallel into the display memory 66 for display on the visual display 28. The display memory 66 (FIG. 9) also comprises a dynamic circulating storage means and in one embodiment can be constructed, for example, from a Model TMS-3112 P-Channel Static Shift Register manufactured by Texas Instruments Corporation of Dallas, Texas. This particular register has six bit channels, four of which provide data bit storage in the display memory 66 and two of which, channels 66A and 66B, are single bit channels used for control purposes. The length of the memory is 32 bits which is the maximum number of characters that can be placed in storage. This number is a whole number submultiple of the length of the main memory 64. Data supplied at the inputs to the channels is circulated under the control of a clock signal applied to the clock terminals of the display memories 66, 66A, and 66B. This clock signal is the clock signal CLK for the hand unit 22. This signal is supplied through an AND gate 920 and an AND gate 922 normally enabled by the signal ADV/ to circulate data through the memories 66, 66A, and 66B in synchronism with the circulation of data through the main memory 64. Because of the indicated submultiple relationship, like data items appear at the outputs of the memories 64 and 66 concurrently. Because of the shorter length of the memory 66, a given data item will appear at the output of the memory 66 many times for each time that the same data item appears at the output of the main memory 64.

To control and effect a normal recirculation of data through the memory 66, its output signals LED1, LED2, LED4, and LED8 are returned to one input of an AND gate in each of four input gate arrays 901–904, such as an AND gate 908 in the array 901. The other input to the gate 908 and the corresponding gates in the arrays 902–904 is enabled during recirculation by a signel WRITE/. The output of the gate 908 is forwarded through an OR gate 914 to one input to an AND gate 916, the other input of which is normally enabled by a signal RBF/. The outputs of the four gates in the arrays 901–904 corresponding to the gate 916 are supplied to the input stage of the four data channels of the memory 66. A signal WRITE preceded by an OR gate 924 becomes positive when data is to be entered into the memories 66 and 66B so as to inhibit recirculation.

With regard to the display means 28, this display means consists of eight seven-segment LED displays, each comprising seven control anodes and a common cathode. A BCD-to-7 encoder 936 supplied with the binary coded decimal output signals LED1, LED2, LED4, and LED8 from the output of the memory 66 converts these signals into combinational markings on seven output leads connected in common to the anodes of all of the eight individual display units 28A. The output marking is such that the segments necessary to produce a visual display of the incidated digital character are supplied with an enabling potential by the encoder 936. This encoder is selectively enabled to supply an output to the common output lines under the control of an AND gate 942. The cathodes of the individual display elements 28A are enabled in sequence by a cathode driver circuit 944 to permit the digits to be shifted into the display 28 in sequence and permit selective right and left justification of the display.

The selective enabling in sequence of the individual display units 28A by the cathode drivers 944 is controlled by a divide-by-8 counter 836 (FIG. 8) having a count enable terminal normally enabled by the signal INH/. This counter includes a reset terminal normally supplied with a low level signal SRS. The counting input of the counter 836 is provided by the system clock signal CLK. The output of the counter 836 provides eight decoded output signals X0–X7. These signals are supplied to the inputs of the drivers 944. When the signal X0, for example, is at a high level, the cathode of the extreme left-hand character display device 28A (FIG. 9) is enabled. Since the counter 836 provides eight discrete decoded outputs corresponding in number to the eight character display devices 28A and since the display memory 66 has a storage capacity of 32 digits, the drivers 944 are sequentially enabled four times during each cycle of circulation through the display buffer 66 in synchronism with four cycles of operation of the counter 836.

To provide an indication of the four different cycles of the counter 836, a pair of additional flip-flops 838 and 840 are provided. The toggle input of the flip-flop 838 is provided with the signal X7/, and the $\overline{Q}$ output of the flip-flop 838 is coupled to the toggle input of the flip-flop 840. The two flip-flops 838 and 840 provide two output signals S16 and S32, respectively, the states of which permit identification or differentiation of the four cycles of the counter 836 relative to the single cycle of circulation through the display memory 66.

As set forth above, manual entries from the keyboard input 26 are loaded into the display memory 66 concurrently with their transfer into the main memory 64. Assuming that an operator presses one of the entry keys 46 in the manner described above, this digit is stored in the keyboard buffer 26 (FIG. 6) to provide the output signals KB1F, KB2F, and KB8F under the control of the keyboard strobe signal KBS. These signals are applied to individual gates similar to the gate 912 in the four gate arrays 901–904. All but one of the remaining inputs to the gate 912 and the corresponding gates are enabled by the more positive signals SEARCH/ and MXFR/. The gate 912 and the corresponding gates in the arrays 902–904 are inhibited by the signal LOAD. Except for the recirculation gate 908, the other input gates 906 and 910 and their corresponding gates in the arrays 902–904 are inhibited by two signals SLF and MXFR.

When the load point counter 68 next generates the signal LCDC indicating the next empty time slot for receiving a digit in the main memory 64, the signal LOAD is generated in the manner described above. This signal completes the enabling of the gate 912 and the corresponding gates in the gate arrays 902–904 for one clock period so that a pattern of high and low level signals representing the binary 1s and 0s of the digit code are supplied to the input to the memory 66 to be stored in one time slot. In the gate array 901, the enabled gate 912 provides a 1 or 0 representing signal through the OR gate 914 and the AND gate 916 to the input to the memory 66.

The signal LOAD is also applied to the OR gate 924 to provide a more positive signal WRITE. The inverted signal WRITE/ inhibits the gate 908 and the corresponding gates in the arrays 902–904 to prevent normal data recirculation.

In addition, the more positive signal LOAD is effective through an OR gate 926 and an AND gate 928 normally enabled by the signal RBF/ to supply a bit for storage in the control channel 66A in the same time slot occupied by the entered digit in the display memory 66. This bit eventually produces the signal ENABLE at the output of the control channel 66A which is normally circulated through the channel 66A by a gate 925. This gate is normally enabled by the signal WRITE/ and is inhibited when data is entered into the memory 66.

At the same time that the digit is entered into the memory 66 and the control bit is entered into the memory channel 66A, the counter 836 and the flip-flops 838 and 840 are reset to a normal condition. More specifically, when the signal LCDC rises to a more positive potential, a gate 804 is fully enabled because the signal ENTER is at a positive level indicating that the hand unit 22 is in the enter mode. The more positive potential supplied at the output of the gate 804 is effective through an OR gate 806 to partially enable an AND gate 810 and is directly effective to partially enable an AND gate 812. During the following inverted clock signal CLK/, the gates 810 and 812 provide two signals SRS and SR. These two signals are applied to the reset terminals of the counter 836 and the flip-flops 838 and 840. The flip-flops 838 and 840 are reset to drop the signals S16 and S32 to a low level. The counter 836 is reset so that only the output signal X0 is at a more positive level.

As described above, the signal INH is generated two clock periods following the generation of the signal LOAD used to enter the digit concurrently in the two memories 64 and 66. This signal effects the slipping of the repetitive time frame of the load point counter 68 a single time slot so that the next empty time slot is marked for receiving the next digit. The inverted signal INH/ inhibits the count enable terminal of the counter 836 so that one of the clock signals CLK applied to its counting input is lost. Thus, the counter 836 is slipped a single time slot in synchronism with the same operation in the load point counter 68. Since the clock signal CLK lost to the input to the counter 836 is effective to advance the memories 66, 66A, and 66B, the previously entered digit in the memory 66 will now appear at the output of the memory when the signal X7 is at a high level rather than when the signal X0 is at a high level.

Thus, 32 clock periods following the entry of the first digit into the memory 66, this digit appears at the output of the memory and is applied to the input of the encoder 936. Due to the counting progression of the counter 836 and the flip-flops 838 and 840, the signal X7 is at a more positive level, and the flip-flops 838 and 840 are set to provide the signals S16 and S32. The signal X7 is effective through the drivers 944 to provide enabling potential for the cathode for the extreme right-hand display device 28A (FIG. 9). Since the signals S16 and S32 are at a more positive level, two of the inputs to the AND gate 942 are enabled. A third input is enabled by a more positive signal EBK/.

The fourth input to the AND gate 942 is provided by the signal ENABLE. This signal is derived from the output of the channel 66A and is used to enable the display 28 in only those time slots of the main memory 66 in which a digit is stored. Thus, the channel 66A provides an automatic zero suppression for nonsignificant digits. As set forth above, a bit is stored in the control channel 66A under the control of the signal LOAD each time the digit is loaded into the input of the memory 66. Accordingly, the signal ENABLE rises to a high level each time that a digit appears at the output of the memory 66. Accordingly, the signal ENABLE is now at a high level to enable a fourth input to the AND gate 942.

The fifth input to the AND gate 942 is provided by a monostable timing circuit 940 which is set under the control of an OR gate 938. The timing circuit 940 has a delay interval on the order of 15 seconds and is provided to prevent the display 28 from being energized for an excessive period of time and thus increasing the power consumption of the hand unit 22. When a key is operated in the keyboard input 26, the signal DC1 is generated in the manner described above, and this more positive signal is forwarded through the gate 938 to set the monostable circuit 940 and thus to provide a fifth enabling input for the AND gate 942 for a period of around 15 seconds.

It should be noted that the delay interval of the timing circuit 940 is shown within the rectangular logic symbol in terms of absolute time because this timing function is independent of the frequency of the clock signal CLK. In other timing circuits, such as the circuit 716, the delay interval is marked in the logic symbol in terms of clock periods.

With the gate 942 completely enabled, an enable signal is supplied to the encoder 936 so that the output of the memory 66 is encoded and applied in common to all of the display devices 28A. Since, however, only the cathode for the extreme right-hand display device 28A is provided with an enabling potential, the first character stored in the memory 66 appears in a right-justified manner at the extreme right-hand position or display device 28A of the display assembly 28. As the next clock pulse appears, the signal ENABLE drops to a low level inhibiting the gate 942, and the encoder 936 is no longer able to supply input signals to the anodes of the display devices 28A. The display appears after each 32 following clock pulses so that the display of the character in the extreme right-hand display device 28A appears continuous.

It should be noted that the AND gates 804, 810, and 812 and the OR gate 806 continuously generate the reset signals SR and SRS each time that the signal LCDC is generated by the load point counter 68 marking the empty time slot. These signals, as set forth above, reset the counter 836 and the flip-flops 838 and 840. This resetting does not, however, change the relationship of the counter 836 to the data circulating in the memory 66 because both the load point counter 68 and the counter 836 have been slipped a single time slot incident to the data entry and thus are in a synchronous position with regard to the repetitive time frame. This means that the counter 836 is in a position in which the signal X0 is more positive at the time that the signal LCDC effects the resetting of the counter to a state in which the signal X0 is more positive. The first entered digit, however, remains tracked by the more positive signal X7. This resetting insures that the counter 836 is always in a condition in which the signal X0 is more positive when the signal LCDC occurs marking the empty time slot. In this manner, each successive digit entered by manual actuation of the keyboard input 26 always occurs when the counter 836 is in the setting generating the signal X0.

Assuming that the operator now enters a second digit into the main memory 66, this digit is again loaded into the display buffer 66 on the signal LOAD during the time at which the signal X0 provided by the counter 836 is positive, which signal in effect tracks the next empty time slot in the display memory 66. Further, the signal LOAD supplies a bit in the control channel 66A in the time slot adjacent the preceding bit so as to mark the presence of a second digit in storage. During this operation, the signal INH/ inhibits the count of the counter 836 a single time slot so that it remains in step with the load point counter 68. By losing this additional time slot, the first digit entered now appears when the signal X6 is at a positive level, and the second entered digit appears when the signal X7 is positive.

This means that when the flip-flops 838 and 840 are set marking the correct portion of the 32 time slot repetitive time frame, the more positive signal X6 controls the driver 944 to display the first entered digit in the second from right display device 28A, and the signal ENABLE for enabling the AND gate 942 is derived from the control channel 68 to permit the display of the first entered digit on this display device 28A. During the next time slot when the signal X7 is at a more positive level, the second entered digit is displayed on the right-hand display device 28A, and the corresponding bit at the output of the control channel 66A provides the signal ENABLE for the AND gate 942.

The display memory 66 and the display 28 operate in this manner to provide a display proceeding from left to right from most significant to least significant digits in a right-justified mode as each additional digit of a message is entered into the hand unit 22 using the keyboard input 26. It should be noted that if more than eight digits are entered in a message, these digits are stored in the memory 66, but only the eight last entered or least significant digits are displayed on the display device 28. This is true because as the leading digits are slipped backwardly in the time frame due to the entry of subsequent digits, one or the other of the flip-flop 838 and 840 will not be in a set condition when these outputs appear at the output of the memory 66. Since one of the flip-flops 838 and 840 is not set, one of the signals S16 or S32 is not at a positive potential, and the gate 92 for enabling the encoder 936 is inhibited to prevent the transfer of these outputs to the commonly connected anodes of the display devices 28A.

As set forth above, the operator can delete a digit from the main memory 64 by operating the shift key 52 with the hand unit 22 in its enter mode. This manual actuation of the shift key 52 also removes the corresponding digit from the display memory 66 to prevent the further display of this digit. The technique used is to backspace the digit in a time reference relationship between the memory 66 and the counter 836 so as to prevent its display, but the digit is not erased from the memory 66. If a corrected digit is then entered by the operator, it is written over the digit in storage in the time slot in the memory 66 occupied by the incorrect digit.

More specifically, when the shift key 52 (FIG. 3) is actuated, the load point counter 68 is incremented a single time slot in the manner described above during one repetitive time frame of the main memory 64, and during the next time frame the incorrect digit is erased from the accessed time slot containing the incorrect entry. The incrementing of the load point counter 68 is achieved by the advance signal ADV. The inverted advance signal ADV/ normally enables the AND gate 922 for supplying the clock signal to the display memory components 66, 66A, and 66B. With the signal ADV/ now at a low level for one clock period, one clock pulse CLK defining one time slot in the memory 66 is inhibited, and the repetitive time frame of the memory 66 is slipped one time slot. Decrementing the repetitive time frame of the memory 66 has the same effect as incrementing the count of the counter 836. Since the incorrect digit previously appeared during the time in which the signal X7 was present or more positive and since the repetitive time frame of the memories 66 and 66A has been decremented a single time slot, the incorrect digit now appears when the signal XO is more positive. However, the count of the counter 836 has effectively been slipped into the next count of eight defined by the flip-flops 838 and 840 so that both of the signals S16 and S32 are not now at a high level when the signal XO is high and the signal for enabling the encoder 936 is not present. Thus, the incorrect digit is still stored in the memory 66 in the time position defined by the signal XO, but the display 28 is not enabled at this time, and the incorrect digit is no longer displayed. If the operator corrects the incorrect digit by keying the correct digit in through the keyboard input unit 26, this digit is written over the incorrect digit under the control of the signal LOAD in the manner described above. If no further digits are entered by the operator, the incorrect digit remains in storage but in a time position at which it cannot be displayed by the display means 28.

As set forth above, display of a message in the display means 28 is terminated by the actuation of the end-of-message key 50. When the operator actuates the key 50, the end-of-message code is stored in the main memory 66 in the manner described above under the control of the more positive signal EOMK. The signal EOMK sets a flip-flop 860 so that a signal EBK becomes more positive. The inverted signal EBK/ forms one of the inputs to the AND gate 942. Accordingly, when the inverted signal EBK/ drops to a low level, the gate 942 is inhibited, and the output signals provided by the display memory 66 can no longer be translated and applied to the display means 28. In this manner, the display is terminated. The display can also be terminated if no key actuations are made resulting in the signal DC1 for setting the flip-flop 940 within the time period of this circuit.

If, however, the operator desires to view the message previously entered into the main memory 64 either following the actuation of the end-of-message key 50 or following the timing out of the circuit 940, the recall key 56 can be actuated. When the recall key 56 is actuated, the keyboard input 26 provides a more positive message recall signal MESSR. This signal is forwarded through the OR gate 938 to again set the timing circuit 940 so that one of the inputs to the gate 942 is enabled. The signal MESSR is also effective through an OR gate 861 to reset the flip-flop 860 so that the inverted signal EBK/ again becomes positive. This completes the enabling of the gate 942 when the digits to be displayed by the display means 28 appear at the output of the display memory 66 in the proper time in the manner described above. This recall display is terminated either by the timing out of the circuit 940 or by the actuation of one of the keys 46, if the end-of-message key 50 was previously depressed, or by the actuation of the end-of-message key 50 in the manner described above if this key had not been previously depressed.

The actuation of one of the digit keys 46 following a preceding actuation of an end-of-message key 50 advises the controls for the display memory 66 that a new message is being entered into the main memory 64 and clears the display memory 66 and the control memory channel 66A. More specifically, when the end-of-message key 50 is depressed, the signal EOMK is effective through an OR gate 822 whose output is coupled to the D input of a flip-flop 824. On the trailing edge of the keyboard strobe signal KBS generated by the actuation of the end-of-message key 50, the more positive signal EOMK provided through the OR gate 822 causes the setting of the flip-flop 824 to provide a more positive signal RMEOM. This signal is applied through an OR gate 814 to one input of an AND gate 816. The other input to this gate comprises the keyboard strobe signal KBS.

Accordingly, when the next key in the keyboard input 26 is actuated, another keyboard strobe signal KBS is generated to complete the enabling of the gate 816. The more positive output from this gate is forwarded through an OR gate 818 to set a reset buffer flip-flop 820. The setting of the flip-flop 820 provides a more positive reset buffer signal RBF which is applied to the toggle input of a flip-flop 930. The leading edge of this signal sets the flip-flop 930 so that a more positive potential is applied to one input of an AND gate 932. The next following clock signal CLK completes the enabling of the gate 932 so that a flip-flop 934 is set. The more positive output of the flip-flop 934 is returned to the reset input of the flip-flop 930 to reset this flip-flop and apply an inhibit to the gate 932.

The more positive output from the flip-flop 934 applies a high input signal to the memory control channel 66B which is stored therein by the signal CLK. Accordingly, a single bit is written into the memory channel 66B. As the inverted clock signal CLK/ becomes more positive, the flip-flop 934 is reset so that only this single bit is stored in the first time slot of the memory channel 66B. The memory channel 66B provides a means for timing the clearing of the display memory 66.

More specifically, when the reset buffer flip-flop 820 is set, the inverted reset buffer signal RBF/ drops to a low level and applies an inhibit to the gate 916 in the gate array 901 at the input to the main memory 66 as well as to the corresponding gates in the gate arrays 902–904. This inhibit means that nothing but binary 0 s can be written into the memory 66. In addition, the more negative signal RBF/ inhibits the gate 928 to erase from the control memory channel 66A those bits used to generate the signal ENABLE for rendering the encoder 936 effective to transfer data from the output of the memory 66 to the display 28.

At the end of a complete reference time frame as defined by the clock signal CLK, the bit written into the input stage of the control channel 66B appears at its output as a more positive signal C320. This signal lis applied to the reset terminal of the reset buffer flip-flop 820 to reset this flip-flop. Thus, the display memory 66 has now been cleared and is in condition to receive the next message data entered through the keyboard unit 26. The keyboard strobe signal initiating the setting of the flip-flop 820 also presents the keyboard output buffer signals KB1F–KB8F to the inputs to both of the memories 64 and 66. The signal RBF/ applied to the gate 746 prevents the generation of the signal LOAD until the clearing of the memory 66 is completed. This prevents any attempt to enter data in either of the memories 64 and 66 until the memory 66 has been cleared.

This keyboard strobe signal KBS that set the reset flip-flop 820 also exercises another control function. Since the output of the gate 822 is now at a low level, the trailing edge of this signal KBS resets the flip-flop 824 to terminate the more positive signal RMEOM and to place the inverted signal RMEOM/ at a more positive level. The removal of the high signal RMEOM prevents further setting of the flip-flop 820 until after the end-of-message key 50 is next operated. The high level signal RMEOM/ at the gate 861 insures the resetting of the flip-flop 860 to provide the signal EBK/ necessary for reading data from the display encoder 936. This latter function is performed each time that the end-of-message key 50 is actuated. In this connection, it should be noted that the flip-flop 824 is set on each occurrence of the signal EOMK to lift the continuous reset on the flip-flop 860 provided by the signal RMEOM/ and to permit the setting of this flip-flop by the signal EOMK which terminates a message display by the assembly 28 as described above.

The digits of subsequent meassages terminated by end-of-message codes are stored in the display memory 66 and displayed by the display assembly 28 in the manner described above with the visual display being terminated by each actuation of the end-of-message key 50 subject to being returned to the display means 28 by the recall key 56 and cleared from the display memory 66 by the actuation of a digit key 46 following actuation of the end-of-message key 50.

TRANSFER OF MESSAGE TOTAL FROM THE COUNTER 74 TO THE DISPLAY ASSEMBLY 28

As set forth above, the counter 74 (FIGS. 4 and 8) is controlled by the end-of-message key 50 to provide a running total of the total number of messages stored in the main memory 64. This total can be transferred for display on the display means 28 by actuating the count key 54. When the count key 54 is actuated, the keyboard input 26 (FIG. 6) provides a more positive signal MESSC. This signal is forwarded through the OR gate 622 to hold the busy function flip-flop 620 in a reset state to prevent any data entries into the main memory 64 and to prevent any change in the setting of the load point counter 68.

The positive signal MESSC is applied through the gate 861 to insure the reset condition of the flip-flop 860 and the high level of the signal EBK/ used to enable the display encoder 936. The signal MESSC also sets the flip-flop 824 on the trailing edge of the signal KBS through the gate 822 to provide the high signal RMEOM in the preparation for resetting the display memory 66 after he message count has been viewed. The signal DC1 provided by the operation of the count key 54 also sets the timing circuit 940 through the gate 938 to provide a fifteen second enable for the display encoder 936.

Since the hand unit 22 is in its enter mode, the more positive signals ENTER and MESSC enable an AND gate 826 to set a flip-flop 828. The more positive output of the flip-flop 828 partially enables an AND gate 832. Another input to the gate 832 is enabled by the signal RBF/ which indicates that the display memory 66 is not in the process of being reset. When the flip-flops 838 and 840 are set, the signals S16 and S32 are at a more positive level to complete the enabling of an AND gate 830 so that another input to the gate 832 is enabled. The full enabling of the gate 830 indicates that the proper sector in the counting cycle or repetitive time frame defined by the components 836, 838, and 840 for display is being entered. The last input to the gate 832 comprises the signal X1 which is an output from the counter 836. The completion of the enabling of the gate 832 sets a flip-flop 834 to provide a more positive signal MXFR which resets and holds reset the flip-flop 828.

The more positive signal MXFR is used to control the transfer of the total standing in the message counter 74 into the display memory 66. The signal MXFR enables one input to four gates 854-857 whose other inputs are controlled by four gate arrays 841-844. Each of these arrays includes three AND gates similar to three AND gates 846, 848, and 850 and a single OR gate similar to an OR gate 852 provided in the gate array 841. The three gates 846, 848, and 850 receive the signals JJ, EE, and AA representing the binary weight 1 bits from the hundreds, tens, and units counters 868, 866, and 864 in the message counter 74. The comparable gates in the gate arrays 842-844 receive the signals corresponding to the binary weights 2, 4, and 8 from the counters 868, 866, and 864. The other inputs to the gates 846, 868, and 850 receive sterring signals provided by the signals X1, X2, and X3 at the output of the counter 836. The corresponding gates in the gate arrays 841 – 844 receive the same three steering signals X1-X3.

Accordingly, when the counter 836 reaches a setting in which the signal X1 is more positive, the gate 846 is enabled to supply a signal representing the binary weight 1 in the hundreds counter 868 through the OR gate 852 and the enabled AND gate 854 to provide a memory input signal MES1. In the same manner, the gate arrays 842-843 during the persistence of the first steering signal X1 control the output gates 855-857 to provide memory input signals MES2, MES4, and MES8 representing the binary weights 2, 4, and 8 of the hundreds digit stored in the hundreds counter 868 of the message counter 74.

The signals MES1, MES2, MES4, and MES8 are applied to one input of four gates in the gate arrays 901-904 corresponding to the gate 910 in the gate array 901. The other inputs to these four gates are enabled by the signal MXFR. Accordingly, the value of the hundreds digit of the count standing in the message counter is read into the memory 66 in the time slot defined by the signal X1. The signal MXFR is also effective through the OR gate 924 to provide a low level signal WRITE/ to inhibit recirculation through the memory 66. The signal MXFR is also effective through the gates 926 and 928 to store a bit in the control channel 66A indicating the presence of a digit to be displayed in the time slot defined by the signal X1.

When the signal X2 is raised to a positive level on the next clock pulse by the counter 836, the signals MES1, MES2, MES4, and MES8 store the value of the tens digit of the message count in the memory 66 in the manner described above. A marker bit is also stored in the memory channel 66A in the time slot defined by the signal X2. On the next clock pulse, the gates 854-858 control the gating arrays 901-904 to store the value of the units digit provided by the counter 864 in the memory 66 in the time slot defined by the signal X3. A marker is also stored in the control channel 66A representing the presence of the units digit in this time slot.

On the next clock signal CLK, the counter 836 raises the signal X4 to a more positive level and resets the flip-flop 834 to drop the signal MXFR to a low level. This inhibits the further storage of data in the memory 66.

The three digits of the message count now circulate through the memory 66 together with marker bits in the control channel 66A. When the flip-flops 838 and 840 are set to provide the more positive signals S16 and S32 and when the bits circulating in the control channel 66A provide the signal ENABLE, the encoder 936 reads the contents of the memory 66 into the display assembly 28. When the counter 836 provides the more positive signals X1, X2, and X3, the second, third, and fourth display devices 28A from the left (FIG. 9) display values of the hundreds, tens, and units digits of the message count. This display continues until such time as it is cleared from the memory 66 or the timing circuit 940 times out to inhibit the gate 942. If the display is terminated by the circuit 940 timing out, the display can be refreshed by actuating the recall key 56 to provide the signal MESSR in the manner described above. This resets the timing circuit 940 to again enable the gate 942.

When the operator has inspected the count from the message counter 74 and decides to continue entering further information into the main memory 64, the operation of one of the keys 46 in addition to the normal functions described above incident to loading a digit into the main memory 64 also provides the keyboard strobe signal KBS. This signal sets the flip-flop 820 in the manner described above because of the presence of the more positive signal RMEOM. The setting of the flip-flop 820 provides the more positive signal RBF which clears the memory 66 and the control channel 66A in the manner described above. In addition, the trailing edge of the keyboard strobe signal KBS resets the flip-flop 824 so that the flip-flop 860 is held in a reset state.

DISPLAY OF MESSAGES FROM THE MAIN MEMORY 64 IN THE DISPLAY ASSEMBLY 28

When the operator desires to recall messages previously stored in the main memory 64 for display on the display means 28, the hand unit 22 is converted from its enter mode to its search mode by actuating the switch 48 (FIGS. 3 and 6) to its search position illustrated in FIG. 6. In this position, the flip-flop 652 is set so that the signal ENTER drops to a low level, and the signal SEARCH rises to a high level. The edge detector 654 detects this transition to generate at the output of the OR gate 658 a more positive signal SRB. This signal is applied as one input to the OR gate 818 to again set the reset buffer flip-flop 820. The setting of the flip-flop 820 clears the display memory 66 to insure that no data is contained in this buffer prior to transfer of data thereto from the main memory 64.

The more positive signal SEARCH is also applied as one input to the OR gate 610 to provide the keyboard lockout signal KBL and to illuminate the lamp 60. This advises the operator that data cannot be entered into the hand unit 22 during the time in which this unit is in its search mode. The more positive signal KBL also prevents the generation of the keyboard strobe signal KBS. The high level signal ENTER/ is effective through the gate 622 to hold the flip-flop 620 reset to prevent the generation of the signal BUSF. The high signal SEARCH holds the flip-flop 824 reset to prevent the generation of the signal RMEOM. The signal SEARCH/ also inhibits the four gates corresponding to the gate 912 in the input gate arrays 901-904 at the input to the display memory 66. The low level of the signal ENTER inhibits the gate 734 so that actuation of the shift key 52 in the search mode cannot initiate a backspace function. The lower level of the signal ENTER also inhibits one input to the gate 1028 so that the memory full indication provided by the lamp 62 under the control of the output point counter 78 cannot be provided when the hand unit 22 is in a search mode.

The recall of the first recorded message beginning with the most significant digit marked by the output point counter 78 is initiated by manual actuation of the end-of-message key 50 and results in the transfer of the first complete message in sequence from the main memory 64 to the display memory 66 and its display by the display means 28. More specifically, the actuation of the end-of-message key 50 provides the signal EOMK which enables one input to an AND gate 1074, the lower input to which is enabled by the signal SEARCH. When the keyboard strobe signal KBS generated incident to the actuation of the key 50 appears, the gate 1074 is fully enabled to provide a more positive signal STSR which sets a flip-flop 1076 to provide a more positive signal ADJ. The signal ADJ provides one input to the OR gate 636 in the clock control circuit 630 so that the clock signal CLK now appears at the high frequency to increase the speed at which the transfer operation takes place.

The signal STSR sets a flip-flop 1004 to enable one input of an AND gate 1006. If the display memory 66 has been cleared, the inverted reset buffer signal RBF/ is at a more positive level so that the gate 1006 is fully enabled to set a flip-flop 1008. The setting of the flip-flop 1008 enables one input to an AND gate 1010, the other input of which is provided by the signal OCDC. Accordingly, when the load point counter 78 and more specifically the counter 1000 arrives at the setting in which the decoder 1016 provides the more positive signal OCDC, the main memory 64 is in the position in which the first significant digit of the first message stored in the memory is at the output in the form of the signals M01, M02, M04, and M08. The signal OCDC fully enables the gate 1010 to set the flip-flop 1012.

The setting of the flip-flop 1012 provides a more positive signal flag signal SLF which is a primary control signal used in the withdrawal of data from the main memory 64. As an example, the signal SLF is effective through the OR gate 924 to provide the signal WRITE so that the inverted signal WRITE/ inhibits recirculation of data through the display memory 66. The signal SLF also enables the gate 906 in the gate araay 901 and the corresponding gates in the arrays 902–904 so that the data entry or digit now provided at the output of the main memory 64 is read into the display memory 66 in the time slot defined by the clock signal CLK. Further, the signal SLF is effective through the gates 926 and 928 to store a bit in the control channel 66A representing or marking the presence of a digit to be displayed by the assembly 28 in this time slot.

The signal SLF is also effective through a gate 1002 to reset the flip-flop 1004 and is directly applied to the reset terminal of the flip-flop 1008 to reset this flip-flop. This prevents any attempt to again set the flip-flop 1012 until the next time the end-of-message key 50 is actuated.

The signal SLF also controls the slipping of the counter 1000 in the output point counter 78 a single time slot with respect to the repetitive time frame of the main memory 64 so that the signal OCDC slips one time slot for each digit transferred to the display memory 64. More specifically, the gate 1020 connected to the count enable terminal of the counter 1000 includes as one input the signal SLF/. When the signal SLF rises to a more positive level, an inhibit is applied to the gate 1020 for the number of clock periods or time slots corresponding to the number of digits transferred into the memory 66. In this connection, it should be noted that the signal OCDC persists for only the single clock period in which it was originally generated so that even though the counter 1000 is continuously slipped by the inhibit provided by the signal SLF/, the lower input to the gate 1010 does not remain enabled. This inhibit applied to the count enable terminal of the counter 1000 as well as the enabling signals applied to the gate arrays 901–904 and to the gate 926 in the circuitry associated with the display memory 66 remains applied for a series of clock pulses during which successive digits are supplied from the output of the main memory 64 to the input of the display memory 66. Incident to the transfer of each digit, the count in the counter 1000 is slipped a single time slot or count relative to the repetitive time frame of the main memory 64 so as to maintain an indication over the number of digits removed from the main memory 64. It should be noted that the recirculation path for the main memory 64 is not inhibited, and the digits supplied to the input of the display memory 66 remain in storage in the main memory 64.

This operation continues until such time as the decoder 1022 detects an end-of-message code in the output signals M01, M02, M04, and M08 at the output of the main memory 64. This generates the more positive signal DEOM which is applied through an OR gate 1014 to reset the flip-flop 1012 and terminate the more positive signal SLF. This terminates the slipping of the counter 1000 in the load point counter 78 and the enabling of the inputs to the display memory 66 and the control channel 66A to terminate the transfer of the first message digits from the main memory 64 to the display memory 66. In this connection, it should be noted that the end-of-message code is transferred from the main memory 64 to the display memory 66 and stored therein. Thus, during the next repetitive time frame of the main memory 66, the counter 1000 and the decoder 1016 develop the signal OCDC in the time slot containing the end-of-message code. Accordingly, the signal OCDC and the signal DEOM resulting from the decoding of the end-of-message code following the first message occur in the same time slot. Thus, these two signals and the high level signal SEARCH complete the enabling of a gate 1078 to provide a more positive signal SRIN. This signal is forwarded through an OR gate 1080 to reset the flip-flop 1076. The resetting of the flip-flop 1076 removes the high level signal ADJ, and the clock control 630 returns to a position supplying a low frequency clock signal CLK for use in displaying the withdrawn message.

The inverted signal SRIN/ applies an inhibit to the AND gate 1020 so that an additional clock pulse CLK is inhibited at the input to the counter 1000. This slips the counter 1000 a single time slot so that during the next repetitive time frame of the main memory 64 the signal OCDC is generated in the time slot marking the first or most significant digit in the second message previously stored in the main memory 64.

As set forth above, the more positive signal SLF was generated by the setting of the flip-flop 1012 by the application of the signal OCDC to the AND gate 1010. These two signals occur simultaneously or in the same time slot and thus complete the enabling of a gate 802 so that its output provides a more positive signal SST. This more positive signal is also forwarded through the OR gate 806 to enable one input to the AND gate 810. On the following inverted clock signal CLK/, the signal SRS is generated. The signal SRS resets the counter 836 to its normal setting in which a more positive signal X0 is generated incident to the first transfer of a digit from the main memory 64 to the display memory 66. The signal SST is applied to the set terminals of both of the flip-flops 838 and 840 to prime these two flip-flops to a set condition. Thus, the counting means provided by the counter 836 and the two flip-flops 838 and 840 is primed to a different initial condition incident to the transfer of data from the main memory 64 to the display memory 66. This altered status is used to provide a left-justified display of the message information during the search mode of the hand unit 22.

More specifically, with the flip-flops 838 and 840 primed to a set condition to provide the more positive signals S16 and S32 and with the first digit transferred from the main memory 64 into the display memory 66 in the time slot defined by the more positive signal X0, the transferred digits of the message from the main memory 64 occupy the time slots X0–X7 in sequence. This, in effect, slips the display reference between the circulating display memory 66 and the counting assembly including the counter 836 and the flip-flops 838 and 840 a single time slot so that on each cycle of circulation through the memory 66, the first digit entered into the display memory 66 occurs in the time slot defined by the positive signal X0. This enables the cathode driver in the assembly 944 connected to the extreme left-hand display device 28A. Further, since the timing circuit 940 is set by the signal DC1 generated by the initial operation of the end-of-message key 50 and since the flip-flops 838 and 840 will be set once each cycle of revolution of the memory 66 and since a signal ENABLE is generated at the output of the control channel 66A by the marker bit stored concurrently with the first digit stored in the memory 66, the first digit of the message is displayed on the left-hand display device 28A (FIG. 9). During succeeding time slots defined by the signals X1–X7, the remaining seven digits of the message are displayed on the display devices 28A proceeding to the right (FIG. 9) in the display assembly 28. Thus, the message recalled from main memory 64 is displayed on the display assembly 28 in a left-justified position. As noted above, the end-of-message code is transferred to the display memory 66 and is encoded by the encoder 936 to provide a visual display that is not a character to provide an indication to the operator of the end of a message. This display is provided in the display device 28A immediately to the right of the last digit of the message.

In the event that the length of the message is greater than eight characters, the entire message up to a maximum of 32 characters is stored in the circulating display memory 66 but only the eight most significant characters are first displayed on the display means 28. Additional characters can be placed in the display by actuating the shift key 52 to shift the most significant character out of the display 28 and to shift the remaining characters one step to the left so that the least significant digit not previously displayed is moved into the extreme right-hand display device 28A. When this function is desired, the operator manually actuates the shift key 52 to provide the more positive signal SHIFT out of the keyboard input 26. The functions performed by the signal SHIFT when the hand unit 22 is in its enter mode are inhibited, as described above, because the signal ENTER is at a low level. However, when the keyboard strobe signal KBS resulting from the actuation of the shift key 52 is generated, the signals SHIFT, KBS, and SEARCH complete the enabling of a gate 1068 to set a flip-flop 1070. This provides a more positive signal PHFA which is applied to the OR gate 636 in the clock control circuit 630 to shift the clock signal CLK to its higher frequency. This signal also enables one input to a gate 1072. With the frequency of the clock signal CLK at its high speed, the load point counter 68 quickly reaches the point at which the LCDC signal is generated, and one clock period following this the signal DLCDC becomes high to complete the enabling of the gate 1072. This provides a more positive signal HFA.

When the signal HFA becomes more positive, the inverted signal HFA/ applies an inhibit to one input of the AND gate 920 to remove a clock pulse from the display memory 66 and the control channel 66A so that these two components are slipped one time slot with reference to the repetitive time frame provided by the counting assembly including the counter 836 and the flip-flops 838 and 840. On the next clock pulse, the signal DDLCDC becomes more positive to reset the flip-flop 1070 and terminate the signal PHFA so that the unit 22 now operates with a low speed clock signal CLK.

Since the repetitive time frame of the memories 66 and 66A has now slipped a single time slot with respect to the counting assembly including the counter 836 for steering digits into the display 28, the most significant digit in the message previously displayed by the left-hand display device 28A is not enabled during the period in which both of the flip-flops 838 and 840 are set. The remaining characters are shifted one display device 28A to the left (FIG. 9), and the most significant digit of the digits not previously displayed is moved into display at the extreme right-hand display device 28A. This operation can be repeated as long as desired by the operator and generally will be repeated until such time as the peculiar display indicating the end-of-message code is displayed on the extreme right-hand display device 28A.

To recall the next message from the main memory 64, the operator merely actuates the end-of-message key 50 once again. This next actuation of the end-of-message key 50 provides the signal EOMK which controls the transfer of the next message from the main memory 64 into the display memory 66. In addition, the signal STSR generated by the signal EOMK in the manner described above is also forwarded through the OR gate 818 to set the reset buffer flip-flop 820. This results in generation of the more positive signal RBF which clears the display memory 66 and the control channel 66A in the manner described above. In addition, the low level signal RBF/ applies an inhibit to the gate 1006 to prevent the generation of the controlling signal SLF until such time as the display buffer 66 has been completely cleared.

In this manner, the operator can continuously recall in sequence each message previously stored in the main memory 64. The hand unit 22 includes means for preventing any operation in which, in effect, the main memory 64 is so backspaced that it returns back to the empty time slot for receiving the next digit to be entered marked by the signal LCDC. More specifically, if the signal flag signal SLF is more positive establishing a condition which transfers data from the main memory 64 to the display memory 66 and the signal LCDC is generated by the load point counter 68 indicating that the main memory 64 has been backspaced into the empty time slot marked for receiving the next digit entry, a gate 1032 is fully enabled to set a flip-flop 1034. The setting of the flip-flop 1034 provides a more positive signal SMI. This signal is forwarded through the OR gate 1014 to immediately reset the flip-flop 1032 to terminate the generation of the more positive signal SLF. In addition, the signal SMI is forwarded through the OR gate 1080 to reset the flip-flop 1076 so that the clock signal CLK for the hand unit 22 drops to its low level. In this manner, the main memory 64 is automatically prevented from overrunning into the empty time slot marked by the load point counter 68. This condition is automatically cleared by returning the hand unit 22 to its enter mode.

When, for any reason, the operator desires to return the hand unit 22 to its enter mode, the switch 48 (FIGS. 3 and 6) is actuated to its enter setting, and the flip-flop 652 is reset. This drops the signal SEARCH to a low level and elevates the signal ENTER to a high level. The inversion in the levels of the signals SEARCH and ENTER performs the functions described above in conditioning the unit 22 to accept data entries and to inhibit this unit from transferring data out of the main memory 64. In addition, the edge detector 656 provides a momentary signal TENT and a momentary signal SRB through the OR gate 658. The signal SRB is forwarded through the OR gate 818 to set the flip-flop 820. The setting of the flip-flop 820 clears the display memory 66 and the control channel 66A in the manner described above, and on the completion of this operation, the flip-flop 820 is reset.

The signal TENT resets the flip-flop 1034 to drop the signal SMI to a low level, in the event that this flip-flop had previously been operated. The signal TENT also effects the restoration of the signal OCDC from the position in which it was left in the search mode to a position marking the most significant digit, i.e., the first digit of the first message for output.

More specifically, the signal TENT is forwarded through an OR gate 1052 to set a restore flip-flop 1054. This flip-flop provides a more positive signal RESTORE which is applied as one input to the OR gate 636 in the clock control circuit 630 so that the clock signal CLK for the unit 22 is provided at its higher frequency. The signal RESTORE also is applied to one input of the OR gate 610 to cause the illumination of the keyboard lockout lamp 60 and the generation of the keyboard lockout signal KBL. This prevents the entry of data into the hand unit 22 during the restoration of the hand unit 22 to a proper condition for entering data. This inhibit is also automatically achieved by the signal KBL in the manner described above.

The signal RESTORE also enables one input to an AND gate 1056 one clock period following the generation of the signal LCDC representing the empty time slot for receiving the next entered digit. The signal DLCDC becomes positive to enable the gate 1056 so that a flip-flop 1058 is set. The setting of the flip-flop 1058 enables one input to an AND gate 1062. The other input to this gate is supplied at the output of an OR gate 1060.

The gate 1060 continuously monitors the output of the main memory 64 for the presence of any binary 1 bits. Since the flip-flop 1058 was set just after the signal LCDC indicating the empty load point, no high level signals M01, M02, M04, and M08 should be encountered until the first digit previously stored in the main memory 64 is encountered. At that time, any high level output from the memory is forwarded through the gate 1060 to fully enable the gate 1062 and to provide a more positive signal STRCMP. This signal indicates that the first digit stored in the main memory 64 has been reached and that the output point counter 78 should be retimed to generate the signal OCDC at this time.

The signal STRCMP completes the enabling of an AND gate 1064, the other input of which is supplied by the signal RESTORE. The enabling of the gate 1064 provides a more positive signal which is applied to the input of a timing circuit 1066 having a timing interval equal to one-half of the high frequency clock. Thus, the setting of the timing circuit 1066 provides a more positive signal RESOC which resets the flip-flop 1058 and terminates the signal STRCMP. The signal RESOC is also forwarded through the OR gate 1018 to reset the counter 1000. As described above, the counter 1000 controls the decoder 1016 to provide the signal OCDC for one clock period when the counter 1000 is in its reset state. Thus, the signal OCDC is now supplied in a time slot relative to the repetitive time frame of the main memory 64 marking the first entered digit.

The signal RESOC also resets the restore flip-flop 1054 so that the signal RESTORE drops to a low level. This controls the control circuit 630 to drop the clock signal CLK to its low frequency. Removal of the signal RESTORE also controls the OR gate 610 to terminate the illumination of the keyboard lockout lamp 60 and to enable the hand unit 22 for the manual entry of data.

STORING DATA IN THE MAIN MEMORY 64 FROM THE PERIPHERAL INPUT UNIT 24

As indicated above, data entries or messages can be stored in the main memory 64 using the peripheral input unit 24. This peripheral unit 24 can be of any suitable type such as a card or tape reader, a further memory unit, or, for example, a portable coded record reader such as the reader shown and described in the copending application of Bruce W. Dobras, Ser. No. 104,955, filed Jan. 8, 1971, which application is assigned to the same assignee as the present application. This peripheral unit provides characters coded in a manner compatible with the coding provided in the hand unit 22 on four output leads providing input signals ID1*, ID2*, ID4*, and ID8* which are coupled to the inputs of four gates in the gate arrays 701–704 corresponding to the gate 720. The peripheral unit 24 can supply these input signals representing one digit during each repetitive time frame of the main memory 64 or can supply these signals continuously at the clock rate of the hand unit 22 so that data is supplied into the memory 64 in bursts. To assist in sychronizing these operations, the clock signal CLK is supplied to the peripheral unit 24. Data can be entered from the peripheral unit 24 only when the hand unit 22 is in its enter mode.

When the peripheral unit 24 desires to supply an input to the hand unit 22, it supplies a more positive signal INSEL*. This signal is applied to one input of the OR gate 636 in the clock control 630 so that the clock signal CLK is now provided at its high frequency. The signal INSEL* is also applied to the reset terminal of a flip-flop 678 and to one input of an AND gate 680 connected to the set terminal of a flip-flop 682. Thus, the flip-flop 678 is reset, and one input to the AND gate 680 is enabled. A second input is enabled by the signal ENTER since the hand unit 22 is in its enter mode. A third input to the gate 680 is enabled by the signal LCDC marking the first idle time slot for receiving the first digit to be entered. The gate 680 is fully enabled at this time and would normally be effective to set the flip-flop 682.

However, this flip-flop has a controlling reset which is supplied with an in-flag signal INFLG/* from the peripheral unit 24. The peripheral unit 24 places the signal INFLG/* at a more negative potential only when the output signals ID1*–ID8* are in condition for transfer to the unit 22. At this time, the flip-flop 682 is set to enable the other input to an AND gate 684 which is partially enabled by a more positive signal INCOMP/*. The more positive potential at the output of the gate 684 provides the signal INRDY* which is returned to the peripheral unit 24 to advise this unit that data is being accepted by the hand unit 22.

The signal INRDY completes the enabling of the gate 720 in the gate array 701 and the corresponding gates in the arrays 702–704 so that the first digit from the peripheral unit is supplied to the input of the memory 64 in the first empty time slot marked by the signal LCDC which caused the setting of the flip-flop 682. The inverted signal INRDY/ applies an inhibit to the gates 718 and 706 in the array 701 and the corresponding gates in the arrays 702–704. This prevents normal recirculation through the main memory 64 and any attempt to enter data into the main memory 64 using the manual keys 46 in the keyboard unit 26 (FIGS. 3 and 6).

Since a digit has been stored in the memory 64, it is necessary to slip the load point counter 68 a single point. Thus, the signal INRDY/ applies an inhibit to the gate 74 to remove the count enable potential from the divide-by-2 counter 748. The counter 748 will slip single time slots for so long as the signal INRDY/ persists. This can comprise one or a number of digits in dependence on the control exercised by the in-flag signal INFLG/*. If this signal rises and falls on a per-digit basis, the flip-flop 682 is clocked between its set and reset conditions as each digit is entered, and the counter 78 is slipped only a single time slot as each digit is entered. On the other hand, if data is entered in bursts, the signal INFLG/* permits the flip-flop 682 to remain set, the signal INRDY remains continuous, successive digits are entered on successive clock pulses CLK defining successive time slots, and the load point counter 68 is slipped a number of time slots in dependence on the number of digits entered. Accordingly, data can be transferred in this manner from the peripheral input unit 24 to the main memory 64 digit-by-digit or in bursts of digits, limited only by the storage capacity of the main memory 64.

The removal of the signals INSEL* and INFLG* manually terminates entry by the unit 24. However, if the memory 64 approaches a completely filled state, the flip-flops 1030 and 1050 are set in the manner described above to cause the illumination of the memory full lamp 62. In addition, the more positive signal CLO generated by setting the flip-flop 1050 is applied to the set terminal of the flip-flop 678. This flip-flop has a predominant set so that the signal CLO sets the flip-flop 678 even though the input select signal INSEL* remains high. When the flip-flop 678 is set, the gate 684 is inhibited to remove the signal INRDY* and further data from the peripheral unit 24 cannot be entered into the main memory 64. In addition, the setting of the flip-flop 678 provides a more positive signal INCOMP* to the peripheral unit 24 to advise this unit that further data cannot be accepted. The hand unit 22 is restored to its normal condition by removal of the input signals referred to above including the input select signal INSEL* which controls the clock circuit 630 to reduce the frequency of the clock signal CLK to its low level.

The hand unit 22 also includes a number of miscellaneous circuits providing certain safeguards to insure the accurate entry of information into the main memory. More specifically, if two keys in the keyboard input 26 are concurrently actuated, the keyboard input 26 (FIG. 6) provides a more positive signal DC2. This signal is forwarded through an OR gate 604 to set an error flip-flop 606. The more positive output from the flip-flop 606 is applied as one input to the OR gate 610 to develop the more positive keyboard lock signal KBL and to illuminate the lamp 60. These perform the same functions as set forth above. The flip-flop 606 can be reset by either of the more positive signals SHIFT or MR through an OR gate 608.

Another possible condition giving rise to the erroneous entry of data is the actuation of two keys in the keyboard input 26 so quickly that one digit is not entered before the next digit is presented. When this happens, the signal BUSF will be at a more positive level from the first key entry and is effective through an OR gate to enable one input to an AND gate 602. If the keyboard strobe signal KBS becomes positive on the second key actuation during the persistence of the signal BUSF, the gate 602 is enabled to again set the flip-flop 606. A further condition protected against in the hand unit 22 is the actuation of a key following a backspace function so quickly that an attempt is made to enter the digit before the backspace function which requires two revolutions of the main memory 64 is completed. When this condition occurs, the signal ADV generated during the backspace function is at a more positive level and is forwarded through the OR gate 600 to enable the upper input to the gate 602. If the keyboard strobe signal KBS becomes positive from a following key actuation, the flip-flop 606 is again set through the gates 602 and 604. Further, a unit 611 is provided which is responsive to the voltage of the batteries 506 and 512 (FIG. 5) used to power the hand unit 22. If these batteries provide potentials below the level necessary for proper operation of the unit 22, the detector 611 provides a more positive input to one input of the gate 610, and the keyboard lockout signal KBL is again provided in conjunction with the illumination of the indicator lamp 60.

TRANSFER OF DATA FROM THE HAND UNIT 22 TO THE TRANSMITTER 30

As set forth above, the portable hand unit 22 can be plugged into the stationary transmitter 30, and the contents of the main memory 64 transferred through the transmitter 30 over, for example, a signaling channel 36 to a central data processor or ultimate data utilization device 38. When the hand unit 22 is plugged into the transmitter 30, the connections shown in FIG. 5 are established including the connections shown schematically by the connector 541 for interconnecting the logic components 22A of the hand unit 22 with the logic components 30A of the transmitter 30. Further, the switch 48 on the hand unit 22 is operated to its enter setting to establish the conditions described above because data can be withdrawn from the main memory 64 only when the hand unit 22 is in its enter mode.

The details of the transmitter are shown in the circuit diagrams of FIGS. 11 and 12, annd these components are interconnected with the logic components of the hand unit 22 as indicated by the signals including an asterisk. The units 22 and 30 are conditioned for operation as soon as they are interconnected. To provide the transmitter 30 with a signal indicating the proper coupling of the two units, a connector 1240 is provided which can, for example, comprise one of the connectors shown generally as 541 in FIG. 5. The connector 1240 applies a ground to a voltage dropping resistor so that a signal UD1 drops to a low level. This signal is applied to one input of an OR gate 1220, the output of which is coupled through an inverter 1222 to a reset terminal of a flip-flop 1216. When the signal UD1 drops to a low level, one resetting source for the flip-flop 1216 is removed. Another input to the gate 1220 comprises the signal ENTER/which is at a low level as soon as the hand unit 22 has been switched to the proper enter mode. The other input to the gate 1220 comprises a reset signal RES which is normally at a low level. Accordingly, the flip-flop 1216 is free to be set.

To permit transmission of data from the transmitter 30 to the remote unit or central processor 38 over the signaling link 36, a modem provides an interface between the signaling link 36 and the transmitter 30. This modem can comprise any one of a number of known modem units such as one of the Series 202 modems supplied by Western Electric Company, Inc. More specifically, the unit 30 is designed for use with a Series 202E-7 modem. To permit the transmitter 30 to be used with a variety of such modems, the transmitter 30 includes a more positive potential coupled through a resistance element to a connector or terminal 1112 to provide a request-to-send signal required by certain of the modems. The transmitter 30 is also coupled with the modem by a pair of connectors or terminals 1113 and 1114. The connector 1114 normally provides a more negative signal when the transmitter 30 is not in condition to transmit data over the line and provides a more positive signal when the transmitter 30 is prepared to transmit data.

The level of the signal provided at the connector 1114 is controlled by an AND gate 1132 and a driver 1134. One input to the AND gate 1132 is normally provided with a more negative signal RDYXMT and a more positive signal DROP/. Thus, the gate 1132 normally controls the driver 1134 to provide a low level signal at the terminal 1114.

The modem can be controlled in either a manual mode or an automatic mode to permit the transmission of data from the transmitter over the signaling channel 36 to the central processor 38. In the manual mode, the operator, after plugging the hand unit 22 into the transmitter 30, uses a conventional dial to establish the communication link 36 to the central processor 38. When the link has been established, the modem returns a more positive signal to the connector 1113 which is forwarded through a driver 1124 to provide a more positive signal CTS. This signal is effective through a driver 1226 to illuminate the on-line lamp 44 and to provide an indication to the operator that transmission can be initiated to the central processor 38. In the automatic mode, the demand for actual transmission is initiated from the central processor 38. To place the system in this mode, the operator actuates the automatic key provided on the modem, and the clear-to-send signal resulting in the more positive signal CTS is returned by the central processor 38 whenever transmission from the transmitter 30 is desired. In either event, the transmission cannot be initiated until the clear-to-send signal CTS is received.

Since the transmitting capacity of the signaling line 36 may not be the same as the frequencies normally used in the hand unit, the transmitter 30 includes its own clock signal source for controlling the speed at which data is removed from the main memory 64 in the hand unit 22 and for controlling the rate at which data is transmitted over the link 36 to the central processor 38. This clock signal source comprises an oscillator 1200 haivng, for example, a 1.2 KHz output frequency supplying a signal 0T. This signal is also supplied to a divide-by-10 counter 1202 which, in conjunction with an AND gate 1204, provides a clock signal 00T with a frequency one-tenth that of the signal 0T. This signal is also forwarded through an inverter 1206 to provide a signal EXTCLK/* for use by the hand unit 22.

When the transmitter 30 is to be operated in either the manual or automatic mode, it is necessary for the operator to actuate the transmit key 40 on the transmitter 30. The transmit key or switch 40 controls the setting of a ready-to-transmit flip-flop 1216. More specifically, the J terminal of this flip-flop is coupled to a potential source normally maintained at ground or reference potential by the normally closed transmit switch 40. When the transmit switch 40 is actuated to provide a momentary open circuit, the flip-flop 1216 is set by the clock signal 0T supplied to its clock terminal. When the flip-flop 1216 is set, a more positive ready-to-transmit signal RDYXMT* is provided which lights lockout lamp 60 (FIG. 6). This signal is applied to one input of an AND gate 1211, the other input of which is enabled by a signal received from a normally reset flip-flop 1208. The more positive signal at the output of the gate 1211 is forwarded through an OR gate 1212 and a lamp driver 1214 to illuminate the ready-to-transmit lamp 42. This provides a visible indication to the operator that the transmitter 30 is in a condition to transmit data. The more positive signal RDYXMT also completes the enabling of the gate 1132 so that this gate is effective through the driver 1134 to provide a more positive data terminal ready signal 1114. As set forth above, this results in a return of the more positive clear-to-send signal CTS at the output of the driver 1124.

The more positive signal CTS also completes the enabling of a gate 1228 so that an inverter 1230 provides a pair of more negative signals CLKEN/* and OUSEL/*. The more negative output from the inverter 1230 also removes a resetting signal for a flip-flop 1234 provided through an OR gate 1236 and an inverter 1238. The more positive signal OUSEL* provides one input to the OR gate 636 in the clock control circuit 630 so that the clock signal CLK of the hand unit 22 is now provided at the higher frequency to quickly advance the main memory 64 to the point at which data can be removed therefrom. The more positive signal CLKEN* partially enables the AND gate 644. When the time cycle of the main memory 64 closely approaches the point at which is located the time slot containing the first digit and marked by the signal OCDC, the output signals OC6–OC12 from the counter 1000 become positive to fully enable the gate 644. The more positive output from the gate 644 is effective through the inverter 646 to inhibit both of the gates 640 and 642 so that neither of the oscillators 632 or 634 can be effective to supply the system clock signal CLK through the OR gate 650.

The more positive signal provided at the output of the gate 644 enables one input to the AND gate 648, the other input of which is provided wth the external clock signal EXTCLK* developed by the transmitter 30 in the manner described above. Thus, the system clock signal CLK is now set at the frequency determined by the oscillator 1200 in the transmitter 30.

At the same time that the clock control circuit 630 is switched over to the external clock frequency, the gate 1026 is enabled by the same signals OC6–OC12 in the manner described above to provide the more positive signal NOC*. This signal is forwarded through an inverter 1232 so that the leading edge of the signal NOC* sets the flip-flop 1234. The setting of the flip-flop 1234 provides the more positive output request signal REQOU*. The low level inverted signal REQUO/ removes an inhibit normally applied through an OR gate 1120 and an inverter 1122 to the reset terminal of a flip-flop 1116. The more positive signal REQUO enables one input to an AND gate 1100 connected to the clock terminal of the flip-flop 1116 and also to a second clock terminal of a shift register 1102 forming a portion of a circuit for transmitting data over the output line 36.

The more positive signal REQOU* is also supplied to one input of an AND gate 664 in the hand unit 22, and the inverted signal REQOU/* dropping to a low level removes one reset applied to a flip-flop 666 through an OR gate 670. Another reset potential is removed from the gate 670 because the hand unit 22 is in its enter mode, and the signal SEARCH is at a low level. The third input to the gate 670 comprising a signal OUCOM is also at a low level at this time. Accordingly, when the time slot containing the first digit to be transmitted is reached, the signal OCDC becomes more positive, and the gate 664 is fully enabled to set the flip-flop 666. This initiates the transfer of data from the main memory 64 through the transmitter 30 to the signaling channel 36.

More specifically, when the flip-flop 666 is set, a signal RDYO/drops to a low level, and one input to a pair of AND gates 668 and 672 is enabled. The low level signal RDYO/inhibits one input to the AND gate 1020 so that the count enable potential is removed from the counter 1000 in the output point counter 78. This continuously slips time slots defined by successive clock signals CLK at the external clock rate from the repetitive time frame of the output counter 78 as the digits stored in these time slots are transferred to and out of the transmitter 30 over the signaling line 36.

This control is effected by the gate 668 which following enabling by the setting of the flip-flop 666 is fully enabled during the same clock signal CLK to provide a more positive signal DATACLK*. This signal is applied, inverted, to the other input of the gate 1100 to fully enable the gate 1100 once during each inverted clock signal CLK/. This clock period is defined by and has the same periodicity as the signal OOT derived from the transmitter 30 by dividing the output of the oscillator 1200 by a factor of 10. Thus, each time that the gate 1100 is enabled, a more positive signal is applied to the second clock terminal of the shift register 1102 and also to the clock terminal of the flip-flop 1116, and this pulse appears with the frequency of the signal OOT.

The shift register 1102 is conventional in construction and can comprise, for example, an SN7495 parallel-in, parallel-out shift register manufactured by Texas Instruments, Incorporated of Dallas, Texas. This component uses TTL logic, the power consumption of which can be tolerated since the transmitter is powered from conventional power sources. When a mode control terminal designated as M is held at a more positive potential, inputs provided at four input terminals A, B, C, D appearing at the left of the rectangular symbol for the shift register 1102 are transferred to four corresponding output terminals A, B, C, D appearing adjacent the right-hand edge of the symbol for the register 1102. This parallel entry is effected on the trailing edge of a pulse applied to the second clock input terminal identified as C2 in the logic symbol. To provide serial input into the stages, a serial input terminal designated as SI is provided. The trailing or negative-going edge of a clock pulse applied to a first clock terminal designated as C1 shifts information from the serial input into the shift register stages when the mode control terminal designated as M is at a low level potential.

The transmitter 30 includes four such shift registers, the shift register 1102 and three additional shift register 1104, 1105, and 1106. The shift register 1102 functions as an input register whose input terminals are supplied with the output signals M08*, M04, M02*, and M01*, 1* from the output of the main memory 64. The register 1102 is operated in only its parallel entry mode because the M terminal is strapped to a more positive potential. The registers 1104–1106 operate in two modes to receive parallel entries and to provide an output in serial form. Certain of the entries supplied to the registers 1104–1106 are derived from the register 1102. Other input information is prewired to the parallel input terminals. The last item of information which is supplied to the D input terminal of the shift register 1106 is derived from a conventional odd parity generator 1110 whose input is supplied with the main memory output signals M08*, M04*, M02*, and M01*. The generator 1110 provides a more positive or more negative signal in dependence on the output code derived from the main memory 64 so as to insure that the data provided by the transmiiter 30 provides an odd parity code.

Accordingly, when the output of the gate 1100 falls, the first digit read out of the main memory 64 is read in parallel into the shift register 1102 to appear at the output terminals A–D of this shaft register. The fall of the potential at the output of the gate 1100 also sets the flip-flop 1116 so that a more positive potential is applied to the J input terminal of a flip-flop 1118 and to the mode control terminals of the shift registers 1104–1106 so that these registers are conditioned for parallel entry. Since the signal DATACLK/* falls on the rise of the signal OOT, there is a one-half clock a period delay before the signal OOT falls to clock a parallel ten-bit data entry into the shift registers 1104–1106. The fall of this signal OOT also sets the flip-flop 1118 so that a more positive signal is supplied through the OR gate 1120 and the inverter 1112 to reset the flip-flop 1116. When the flip-flop 1116 is reset, the mode control line for the registers 1104–1106 drops to a low potential, and the shift registers 1104–1106 are conditioned for serial operation. This is controlled by the OT signals applied to the first clock terminals C1, which signals OT occur at 10 times the frequency of the signals OOT.

The message transmitted by the transmitter 30 is a ten bit, one character message comprising in sequence a low level signal representing a start, data bit 1, data bit 2, data bit 4, data bit 8, two high level signals a low level signal, the parity bit, and a high level signal. These high level signals are interpreted as mark signals and the low level signals as space signals. The preliminary low level signal is provided by the ground strapped to the D input terminal of the shift register 1104. The data bits 1, 2, and 4 are supplied to the input terminals C, B, and A, respectively, of the shift register 1104. The bit 8 signal is applied to the D input terminal of the shift register 1105. The B and C input terminals of the shift register are strapped to positive potential to provide the mark signals. The A input terminal of the shift register is strapped to ground to provide the space or low level signal. The D input terminal of the shift register 1106 is strapped to the output of the odd parity generator 1110 to provide the parity bit, and the terminals A, B, and C of the shift register 1106 are strapped to a more positive potential to provide the terminal high level or mark signal. The output from the shift registers 1104–1106 is derived from the D output terminal of the shift register 1104.

Accordingly, at the first fall of the signal OT, the low level signal from the D output terminal of the shift register 1104 is forwarded through a driver 1108 to a connector 1111 coupled to the signaling line, and the remaining bits in storage in the shift registers 1104–1106 are shifted forward or right-shifted a single step. In this connection, it should be noted that the D output terminal of the shift register 1106 is connected to the serial input terminal of the shift register 1105 and the D output terminal of the shift register 1105 is connected to the serial input terminal of the shift register 1104. Thus, on the fall of the first clock signal OT, the bit 8 signal from the last stage of the shift register 1105 is transferred into the first stage of the shift register 1104, and the parity bit is shifted out of the output of the shift register 1106 into the first stage of the shift register 1105. All of the other bits of information are similarly shifted forward a single stage.

On the fall of the next signal OT, the value of the bit 1 is applied to the driver 1108, and the remaining bits are shifted forward a single step. On the following eight clock pulses, the line driver 1108 is provided with data bits 2, 4, 8, two mark pulses, a space pulse, the parity bit, and a mark pulse representing a stop bit.

After the tenth signal OT, the gate 1100 is again enabled as the second digit in storage is presented by the signals M01* –M08* to the input of the buffer shift register 1102. During the succeeding signal OOT and 10 signals OT, the second 10 one bit, one character message is transmitted in the manner described above. This operation continues until such time as all of the digits in storage in the main register 64 in the hand unit 22 are transmitted over the signaling channel 36.

This condition is detected in the hand unit 22 by the generation of the signal LCDC which marks the first empty time slot for receiving the next digit. When the signal LCDC appears, all of the data previously stored in the memory 64 must have been transmitted by the transmitter 30,. Accordingly, when the signal LCDC becomes positive, a gate 672 is fully enabled to set a flip-flop 674. The setting of the flip-flop 674 provides a more positive signal OUCOM*. The generation of this signal advises the transmitter 30 that all of the data has been transmitted and is effective in the hand unit 22 to restore the signal OCDC to a position indicating the first stored digit in the first message to prepare the hand unit 22 for a retransmission of data, if desired.

More specifically, the signal OUCOM is effective through the OR gate 670 to reset the flip-flop 666 which prevents the generation of further signals DATACLK* and prevents any further attempts to clock data bits into the input shift register 1102 in the transmitter 30. The resetting of the flip-flop 666 also removes the more positive signal RDYO so that the clock enable terminal of the counter 1000 in the output point counter 78 is again enabled by the AND gate 1020.

The more positive signal OUCOM is also forwarded through the OR gate 1052 to set the flip-flop 1054. The setting of the flip-flop 1054 provides the more positive signal RESTORE and controls the hand unit 22 to return the signal OCDC to the time slot marking the first digit in the first message previously stored in the main memory 64. The signal OUCOM is also applied to one input of an AND gate 676 connected to the reset terminal of the flip-flop 674. Accordingly, when the next clock signal CLK appears, the gate 676 is enabled to reset the flip-flop 674 and to terminate the more positive signal OUCOM.

When the signal OUCOM* is generated, it is forwarded through the OR gate 1236 in the transmitter 30 and through the inverter 1238 to reset the flip-flop 1234. This removes the more positive signal REQOU* and removes the demand from the hand unit 22 for a data playback or tranmit operation. The low level of the signal REQOU also applies another inhibit to one input of the AND gate 1100 so that further data cannot be transferred into the input shift register 1102.

With regard to the transmitter 30, the more positive signal OUCOM* sets a flip-flop 1126 so that a more positive potential is applied to the reset terminal of a flip-flop 1128. This removes the continuous reset signal applied to this flip-flop so that it can toggle on the trailing edge of the signal OOT applied to its clock terminal, the J and K terminals of this flip-flop being continuously supplied with a more positive potential. Accordingly, on the trailing edge of the first signal OOT, the flip-flop 1128 is set to apply a more positive potential to the trigger input of the one-shot 1130. During the following interval, the last digit in the main memory 64 is transmitted. On the trailing edge of the next signal OOT, the flip-flop 1128 is reset. The negative-going signal provided at the Q terminal of the flip-flop 1128 triggers the one-shot or timing circuit 1130 so that the signal DROP becomes more positive, and the signal DROP/ drops to a more negative potential. This more negative potential inhibits one input to the AND gate 1132 so that the driver 1134 provides a low level signal on the connector 1114. This signal advises the modem that the transmission of data has been completed.

When the timing circuit 1130 is set, the signal DROP becomes more positive and resets the flip-flop 1126 so that a low level reset potential is continuously applied to the reset terminal of the flip-flop 1128. This prevents further operation of this flip-flop and insures that the timing circuit 1130 cannot be subsequently triggered. The more positive signal DROP also sets a flip-flop 1208. When thus occurs, the low level signal provided at the $\overline{Q}$ terminal applies an inhibit to one input of the AND gate 1211 so that continuous illumination of the ready-to-transmit lamp 42 is terminated. The setting of the flip-flop 1208 enables one input to an AND gate 1210, the other input of which is couped with a ten Hz signal CF from an oscillator 1224. With the gate 1210 enabled, a ten Hz signal is forwarded through the gate 1210 and the OR gate 1212 and the driver 1214 to flash the lamp 42. This flashing indication provided by the lamp 42 signifies that the data transmission operation has been completed.

Two different modes of operation are now afforded by the transmitter 30 in dependence on whether the operator manually placed the request for a transmission to the central data processor 38 and manually established the communication link 36 or whether the hand unit 22 was plugged into the transmitter 30 and the modem was placed in its automatic mode so that a request for transmission can be initiated from the central processor 38. More specifically, all illumination of the ready-to-transmit lamp 42 is terminated upon completion of the transmission of message information from the main storage unit 64 when the transmission of this data is manually initiated. On the other hand, if the hand unit 22 is plugged into the transmitter 30 and the modem is placed in its automatic mode, the lamp 42 is retained in a flashing condition so that when the operator returns to the transmitter 30, the flashing indication provides an indication that the central processor 38 has requested and received the data from the unit 22, perhaps during the operator's absence. This is controlled by the clear-to-send CTS applied by the modem.

More specifically, if the request for transmission was manually initiated by the operator when the timing circuit 1130 times out and supplies the more positive signal DROP/, the more positive signal signifying data-terminal-ready is supplied at the connector 1114, and the clear-to-send signal CTS which was absent during the period in which the data terminal ready signal was absent returns. This signal is applied to one input of an AND gate 1218. When the timing circuit 1130 was set, and additional timing circuit 1136 having a longer time delay is also set to provide a more positive signal SAM. This signal persists after the circuit 1130 times out and the signal CTS returns. Accordingly, the gate 1218 is fully enabled to provide a more positive reset signal RES. This signal is effective through an OR gate 1209 to reset the flip-flop 1208. The resetting of the flip-flop 1208 removes the enable supplied to the AND gate 1210, and flashing illumination of the lamp 42 is terminated. Further, the more positive signal RES is forwarded through the OR gate 1220 and the inverter 1222 to reset the ready-to-transmit flip-flop 1216. This removes the enabling from one input to the AND gate 1211 and prevents any steady illumination of the lamp 42. Thus, the lamp 42 is no longer illuminted, and the operator is supplied with a visible indication that message transmission has taken place. Further, the ready-to-transmit signal RDYXMT is removed from the hand unit 22, and one enabling signal is removed from the AND gate 1132. This holds the data-terminal-ready signal provided at the connector 1114 at a low level to prevent a retransmission before the operator drops the link 36 to the central processor 38.

If, on the other hand, the request for transmission to the central processor 38 was initiated by placing the modem in its automatic mode, the low level signal provided at the connector 1114 advises the modem that transmission has been completed, and the clear-to-send signal CTS is not returned by the modem unless the central processor 38 requests a further transmission. This will occur after the delay interval during which the signal SAM is positive, and thus the reset signal RES is not generated. This leaves the ready-to-transmit flip-flop 1216 in a set condition so that a subsequent demand for transmission can be initiated from the central processor 38. Since the more positive signal RES is not generated, the flip-flop 1208 remains set, and the lamp 42 remains flashing to advise the operator that transmission has taken place. When the hand unit 22 is placed in the search mode by the actuation of the switch 48 or when the hand unit 22 is disconnected from the transmitter 30 on the operator's learning that satisfactory transmission has taken place, one of the two signals UDI or ENTER/* is provided. These signals are effective through the OR gate 1220 and the inverter 1222 to reset the flip-flop 1216. When the flip-flop 1216 is reset, the inverted ready-to-transmit signal RDYXMT/becomes more positive and is effective through the OR gate 1209 to reset the flip-flop 1208. Thus, the illumination of the lamp 42 is terminated by operator intervention following transmission in the automtic mode.

It should be noted that whenever the flip-flop 1216 is reset to remove the more positive signal RDYXMT or the more positive signal CTS is removed, the gate 1228 and the inverter 1230 are effective to remove the signals OUSEL* and CLKEN*. This returns the hand unit 22 to operation at the low frequency clock 634 and removes the output demand from the unit 22.

Although the present invention has been described with reference to one illustrative embodiment thereof, it should be understood that numerous other modifications and embodiments can be devised by those skilled in the art which will fall within the spirit and scope of the principles of this invention.

What is claimed and desired to be secured by Letters Patent of the United States is:

1. An apparatus for collecting and supplying data entries comprising a dynamic circulating data storage means providing time slots in a repetitive time frame for storing data entries, each of said time slots defining a time at which a data entry may be stored and withdrawn from the data storage means, input means for supplying data entries to the storage means, output means for withdrawing data entries from the storage means, a pair of counters each operable synchronously with the circulating data storage means, one of said counters providing a load signal representing a first time slot when said one counter reaches a predetermined count value and the other of said counters providing an output signal representing a second time slot when said other counter reaches a predetermined count value, a pair of control circuits, one control circuit being controlled by the load signal and coupled to the input means for initiating the storage of a data entry into the storage means during the first time slot and the other control circuit being controlled by the output signal and coupled to the output means for initiating the withdrawal of a data entry from the storage means during the second time slot.

means responsive to the input means for altering by a fixed amount the count within said one counter as each data entry is stored in the storage means, thereby altering the time during which a data entry may be stored after each storage of a data entry, and mens responsive to the output means for altering by a fixed amount the count in said other counter as each data entry is withdrawn from the storage means, thereby altering the time during which a data entry may be withdrawn after each withdrawl of a data entry.

2. The apparatus set forth in claim 1 including means coupled to and responsive to said counters for determining the total number of data items stored in the storage means at any given time.

3. The apparatus set forth in claim 1 in which the input means includes an erase control coupled to the one counter for changing the count within the one counter to condition the one counter to provide a load signal representative of the same time slot represented by the output signal provided by the other counter, whereby the counters are preset to condition the storage means to receive the same amount of data the storage means could receive if it contained no data.

4. A data storage system for storing and supplying messages each containing a group of data items followed by an end-of-message code comprising a circulating memory means providing a plurality of time slots in a repetitive time frame, each time slot defining a time during which a data item or end-of-message code may be stored in the memory means.

input means coupled to the memory means for applying the data items followed by the end-of-message code comprising each message stored to the memory means for storage, a counter providing a control signal when a predetermined count is reached, said count representing a predetermined time slot that corresponds to a predetermined one of the data items, output means coupled to the memory means and responsive to the control signal for withdrawing the predetermined data item from the memory means, control means coupled to the counter and to the output means for adjusting the counter so that the control signal represents a time slot provided by the memory means subsequent to the time slot corresponding to the predetermined data item when the predetermined data item is withdrawn, a data storage and display means for storing and displaying a predetermined number of data items withdrawn from said circulating memory equal to less than all of the data items stored in and withdrawn from the memory means coupled to receive the predetermined data item withdrawn from the memory means, a control circuit means for causing said output means repeatedly to withdraw data items from the memory means, said control circuit means including termination means responsive to the withdrawal of an end-of-message code by said output means for arresting withdrawal of data from said memory means.

5. A data collecting and storing apparatus for use with data items comprising a circulating memory means providing discrete time slots in a repetitive time frame for storing data entries, display means for displaying data items, keyboard input means coupled to the memory means and the display means, output means coupling the memory means to the display means, and a control operable to one setting to actuate means for rendering the keyboard input means effective to supply data items to the memory means for storage in the time slots of the memory means and to supply data items to the display means for display, said control being operable to a second setting to actuate means for inhibiting operation of the keyboard input means to supply data items to the memory means and the display means and means for rendering the output means effective to supply memory data items to the display means for display.

6. The data apparatus set forth in claim 5 including a first counter which determines where within the memory means data entries are to be placed by the keyboard input means when said control is in said one setting and a second counter which determines from where within the memory means data items are to be retrieved by said output means when said control is in said second setting.

7. The data apparatus set forth in claim 5 in which the display means includes a display circulating memory having data item storing time slots in a repetitive time frame, the number of time slots in the time frame of the circulating display memory being a whole number sub-multiple of the number of time slots in the time frame of the memory means.

8. A data collecting and display apparatus for use with data items comprising display means including a number N of individual display devices, a circulating display memory having a data output coupled to the display means, said circulating display memory providing M discrete time slots in a repetitive time frame each presenting one of the data items at said data output during each time slot, the number of time slots M being greater than N, input means for applying data items to the display memory for storage therein, a counter operable in synchronism with said display memory and providing a number N of enabling signals during N different time slots out of the M time slots, each of said N enabling signals having a predetermined time relationship to one of the M time slots, circuit means supplied with the N enabling signals for rendering the display means effective to display any data items presented at the memory data output during N of the M time slots, and control means for altering the time relationship of the enabling signals and the time slots to thereby alter the presentation of the data items from the display memory that are displayed by the display means.

9. The data system set forth in claim 8 in which the control means includes manually actuated means for altering the relative time relationship of the enabling signals and time slots by an amount of time equal to the duration of a single time slot, whereby successive actuation of said means causes successively-stored data items to be displayed.

10. A system for collecting and transmitting data items over a communication link comprising
a stationary transmitter coupled to the link,
a battery-powered unit containing a circulating memory sequentially providing a plurality of time slots in a repetitive time frame for storing data items in the circulating memory, each time slot defining a time at which a data item may be stored or withdrawn from the circulating memory, said unit also containing input means for applying data items to the memory,
a counter in the unit operating in synchronism with the circulation of said memory and providing a control signal at a predetermined count marking a predetermined one of the time slots,
connector means on said transmitter and said unit for detachably interconnecting the transmitter and portable unit, and
circuit means coupled to the connector means and controlled by the control signal for transferring data items from the portable unit to the transmitter for transmission over the communication link, said circuit means including means for altering the relative timing of the control signal generated by the counter and the time slots by one time slot after each data item is transferred.

11. A system for storing and transmitting data items over a communication link comprising
a transmitter coupled to the link and including both connector means and a first clock signal source providing a first frequency clock signal for controlling the transmission of data items over the link,
a battery-powered unit including a circulating memory for storing data items which memory draws battery current in proportion to the speed at which the data is circulated and a second clock signal source providing a clock signal of a second, lower frequency for circulating data items through the memory, said unit also including connector means adapted to be coupled to the transmitter connector means to electrically couple the memory to the transmitter,
and control means operable through the connector means when data items in the memory are to be transmitted by the transmitter for rendering the second clock signal source ineffective, said control means including means for supplying clock signals of the first frequency from the transmitter to the unit to operate the circulating memory during the transmission of data items over the link, whereby data is transmitted over the link at a high rate of speed and whereby data is otherwise circulated at a slow rate of speed to reduce battery drain at other times.

12. The system set forth in claim 11 including
register means in the unit operable in synchronism with the circulating memory and marking a stored data item for transmission,
means for altering the contents of said register means to mark successively positioned stored data items within the circulating memory after successive transmissions of data items,
and means controlled by the register means for preventing the operation of the control means from transmitting any data items until the data items stored in the memory approach a given point in the path of circulation through the circulating memory at which point the stored data item marked by the register means is presented for transmission.

13. A system for storing and transmitting data items over a communication link comprising
a transmitter including transmitting circuitry, a manually actuated start transmission control coupled to the circuitry for initiating transmission of data items over the link, and connectors coupled to the circuitry and control,
a separate unit including a memory having a plurality of data positions each storing a data item to be transmitted and connectors adapted to be coupled to the connectors of the transmitter and connected to the memory to couple the memory to the transmitting circuitry when the connectors of the transmitter and the unit are coupled,
and a control circuit in the transmitter coupled to the connectors of the transmitter for inhibiting the start transmission control until the unit connectors are coupled to the transmitter connectors.

14. A data system as set forth in claim 13 including
a register in the unit operable to provide a control signal normally marking the position of the first data item in the memory to be transmitted and controlled sequentially to mark the position of each of the data items in the memory which are to be subsequently transmitted,
and a control circuit in the unit operable in response to the transmission of the data items for controlling the register to return the control signal to mark the position of said first data item after all of the data items have been transmitted.

15. A data item collecting and storing system comprising
a circulating memory providing a plurality of time slots in a repetitive time frame for storing data items, each time slot defining a time during which a data item may be stored in the memory, said memory drawing power in proportion to its rate of circulation,
a battery power supply for said memory,
a clock signal source coupled to the memory and providing clock signals for circulating data items through the memory, the clock signal source having a first condition of operation for providing a low frequency clock signal and a second condition of operation for providing a higher frequency clock signal,
input means coupled to the memory and operable to supply data items for storage in the memory,
and a control circuit coupled to the clock signal source and responsive to the input means for operating the clock signal source to the second condition of operation to supply the higher frequency clock signal when data items are being entered into the memory by the input means, and for operating the clock signal source to the first condition of operation when no data items are being entered into the memory whereby the entry of a data item into the memory increases the rate of circulation of the data positions to facilitate data entry, and whereby the reduced circulation speed minimizes the current drain on said battery at all other times.

* * * * *